United States Patent
Tsukuda et al.

(10) Patent No.: US 10,205,237 B2
(45) Date of Patent: Feb. 12, 2019

(54) LOOP ANTENNA AND COMMUNICATION CONTROL DEVICE

(71) Applicant: RENESAS ELECTRONICS CORPORATION, Tokyo (JP)

(72) Inventors: Tatsuaki Tsukuda, Tokyo (JP); Hideki Sasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 108 days.

(21) Appl. No.: 15/324,650

(22) PCT Filed: Jul. 30, 2014

(86) PCT No.: PCT/JP2014/070041
§ 371 (c)(1),
(2) Date: Jan. 6, 2017

(87) PCT Pub. No.: WO2016/016964
PCT Pub. Date: Feb. 4, 2016

(65) Prior Publication Data
US 2017/0207535 A1    Jul. 20, 2017

(51) Int. Cl.
*H01Q 7/00* (2006.01)
*H01Q 1/24* (2006.01)
(Continued)

(52) U.S. Cl.
CPC ............ *H01Q 7/00* (2013.01); *H01Q 1/24* (2013.01); *H01Q 3/24* (2013.01); *H02J 50/27* (2016.02); *H02J 50/80* (2016.02)

(58) Field of Classification Search
CPC .... H01Q 7/00; H01Q 1/24; H01Q 3/24; H02J 50/27
See application file for complete search history.

(56) References Cited

U.S. PATENT DOCUMENTS 5,437,057 A * 7/1995 Richley ............... H04B 5/0012
                                                    343/867
7,973,722 B1 * 7/2011 Hill ..................... H01Q 7/08
                                                    343/702
(Continued)

FOREIGN PATENT DOCUMENTS

JP    2000-134809 A    5/2000
JP    2000-269724 A    9/2000
(Continued)

OTHER PUBLICATIONS

International Search Report (ISR) (PCT Form PCT/ISA/210), in PCT/JP2014/070041, dated Oct. 28, 2014.
(Continued)

*Primary Examiner* — Dameon E Levi
*Assistant Examiner* — David Lotter
(74) *Attorney, Agent, or Firm* — McGinn I.P. Law Group, PLLC.

(57) ABSTRACT

A loop antenna 1 includes: a first electrode terminal 2c; a second electrode terminal 2d arranged to make a pair with the first electrode terminal 2c; and a loop-shaped member 2 which has one end connected to the first electrode terminal 2c and the other end connected to the second electrode terminal 2d, is wound a plurality of times, and is made of a conductive material. The first electrode terminal 2c and the second electrode terminal 2d are arranged so as to make a pair with respect to a center line 3 of the loop-shaped member 2. Further, the loop-shaped member 2 includes a first loop-shaped member 2a, a second loop-shaped member 2b, and an intersection part 2e. The intersection part 2e is arranged on the center line 3 in a plan view, and the loop-shaped member 2 is continuously connected and formed to be symmetrical with respect to the center line 3.

20 Claims, 27 Drawing Sheets

(51) Int. Cl.
*H01Q 3/24* (2006.01)
*H02J 50/27* (2016.01)
*H02J 50/80* (2016.01)

(56) References Cited

U.S. PATENT DOCUMENTS

2011/0291490 A1* 12/2011 Shi .......................... H01Q 1/22
307/104
2014/0168026 A1* 6/2014 Nakamura ................ H01F 5/04
343/788
2016/0204836 A1* 7/2016 Lee ..................... H04B 5/0087
343/702

FOREIGN PATENT DOCUMENTS

| JP | 2010-200207 A | 9/2010 |
| JP | 2012-147295 A | 8/2012 |
| WO | WO 2014/083916 A1 | 6/2014 |

OTHER PUBLICATIONS

Japanese Office Action dated Nov. 21, 2017 in Japanese Application No. 2016-537653, with English translation.

* cited by examiner

LOOP ANTENNA AND COMMUNICATION CONTROL DEVICE

TECHNICAL FIELD

The present invention relates to a loop antenna and a communication control device, for example, a technique effectively applied to a multiple loop antenna which wirelessly transmits electric power and a communication control device using the multiple loop antenna.

BACKGROUND ART

For example, Japanese Patent Application Laid-Open Publication No. 2010-200207 (Patent Document 1) and Japanese Patent Application Laid-Open Publication No. 2000-269724 (Patent Document 2) disclose a structure of a multiple loop antenna.

RELATED ART DOCUMENTS

Patent Documents

Patent Document 1: Japanese Patent Application Laid-Open Publication No. 2010-200207
Patent Document 2: Japanese Patent Application Laid-Open Publication No. 2000-269724

SUMMARY OF THE INVENTION

Problems to be Solved by the Invention

In a portable terminal device such as a portable telephone, a wireless power feeding system has been developed, and a spiral structure has been used as an antenna for wireless use in many cases.

However, the inventors of the present invention have found that a strong noise is generated when an antenna having a spiral structure is used for the wireless power feeding system.

In Patent Documents 1 and 2, an antenna structure (loop structure) other than the spiral structure is disclosed, but an electromagnetic wave noise generated from the antenna and an influence thereof are not particularly mentioned.

Other problems and novel features will become apparent from the description of the present specification and the accompanying drawings.

Means for Solving the Problems

A loop antenna according to one embodiment includes: a first electrode terminal; a second electrode terminal arranged to make a pair with the first electrode terminal; and a loop-shaped member which has one end connected to the first electrode terminal and the other end connected to the second electrode terminal and is made of a conductive material. In the loop antenna, the first electrode terminal and the second electrode terminal are arranged so as to make a pair with respect to a center line of a loop shape of the loop-shaped member, the loop-shaped member is wound a plurality of times, and includes an intersection part at which mutually adjacent loop-shaped members intersect with each other in a plan view. Further, in the loop antenna, the intersection part is arranged so as to overlap with the center line in a plan view, and the loop-shaped member is continuously connected and formed to be symmetrical with respect to the center line.

Also, a communication control device according to one embodiment includes: a wiring substrate; a first connection terminal formed on a main surface of the wiring substrate and connected to one electrode terminal of a loop antenna; a second connection terminal formed on the main surface of the wiring substrate and connected to the other electrode terminal of the loop antenna; a power supply circuit connected to the first and second connection terminals; and a communication circuit connected to the first and second connection terminals. The communication control device further includes: a first wiring connected to the first connection terminal; a second wiring connected to the second connection terminal; a first rectifier circuit connected to the first wiring; a second rectifier circuit connected to the second wiring; and a noise filter circuit connected to the first and second wirings and arranged between the first and second connection terminals and the first and second rectifier circuits. Furthermore, each of the first and second connection terminals, the first and second wirings, the noise filter circuit, and the first and second rectifier circuits are arranged so as to make respective pairs with respect to a center line of an arrangement of parts.

A communication control device according to another embodiment includes: a substrate having a first electrode terminal and a second electrode terminal; and a continuous conductive wiring including a first wiring layer in which a first wiring is formed, a second wiring layer in which a second wiring is formed, and a plurality of penetrating electrodes penetrating between the first wiring layer and the second wiring layer and connecting the first wiring and the second wiring. The communication control device further include: a wiring substrate in which a first connection terminal connected to one electrode terminal of the conductive wiring, a second connection terminal connected the other electrode terminal of the conductive wiring, a power supply circuit connected to the first and second connection terminals, and a communication circuit connected to the first and second connection terminal are formed on a main surface. Also, a plurality of wiring layers laminated between the first surface and the second surface of the substrate are formed of the first wiring, the second wiring and the plurality of the penetrating electrodes, one end is connected to the first electrode terminal, and the other end is connected to the second electrode terminal, the conductive wiring is wound by at least two turns along an outer periphery of the substrate from the first electrode terminal. In addition, the plurality of the penetrating electrodes include a plurality of penetrating electrode pairs having a pair of the penetrating electrodes formed of two penetrating electrodes. Furthermore, at least one of the plurality of penetrating electrode pairs connects the first wiring and the second wiring, the conductive wiring continuously extends from the first wiring layer to the second wiring layer and from the second wiring layer to the first wiring layer via at least one of the plurality of penetrating electrode pairs, and the first and second electrode terminals are arranged so as to make a pair along an outer periphery of the first surface in a plan view. Moreover, the plurality of the penetrating electrode pairs are arranged so as to face the first electrode terminal and the second electrode terminal making a pair in a plan view, or each of at least two penetrating electrode pairs of the plurality of penetrating electrode pairs is arranged at the same distance from each of the first electrode terminal and the second electrode terminal making a pair. Alternatively, the plurality of the penetrating electrode pairs are arranged so as to face the first electrode terminal and the second electrode terminal making a pair, and each of at least two penetrating electrode pairs of the plurality of penetrating electrode pairs is arranged at the same distance from each of the first electrode terminal and the second electrode terminal making a pair.

Effects of the Invention

According to one embodiment described above, the electromagnetic wave noise generated from the loop antenna can be reduced.

BRIEF DESCRIPTIONS OF THE DRAWINGS

DETAILED DESCRIPTION OF PREFERRED EMBODIMENTS

Figure 1:
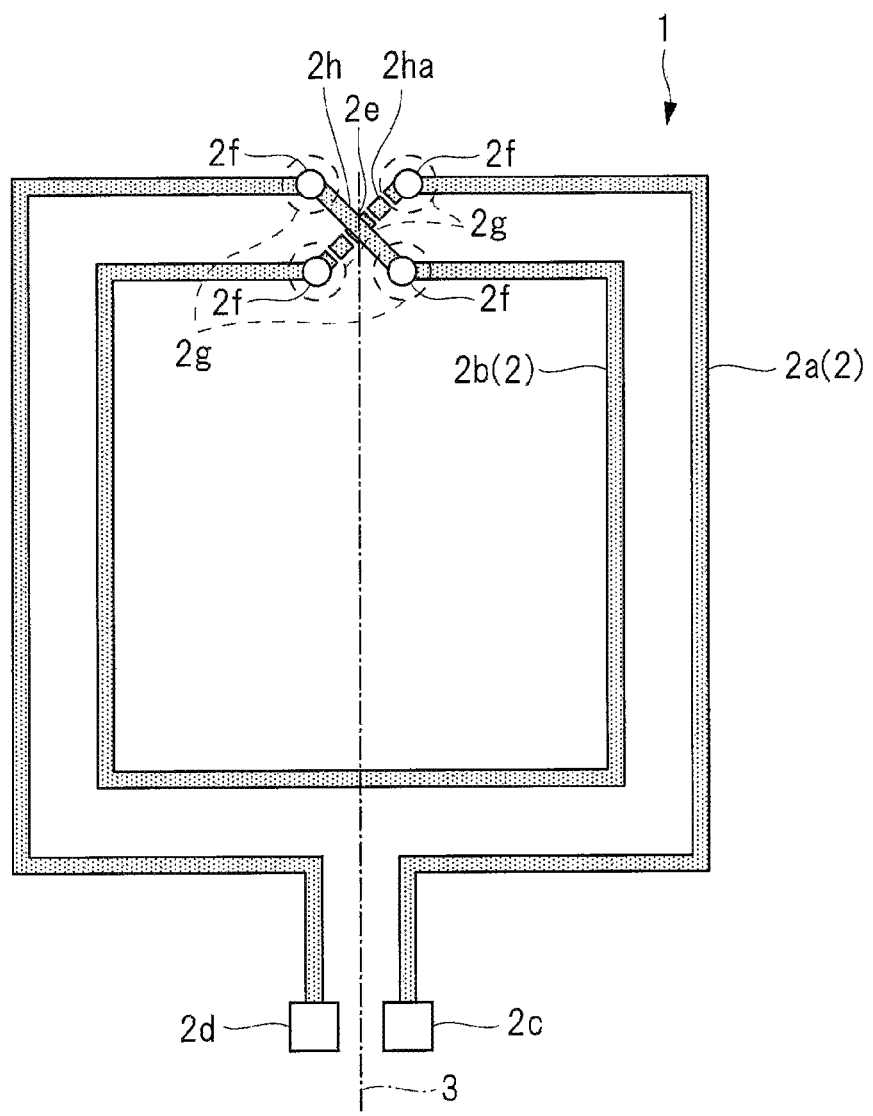
FIG. 1 is a plan view illustrating one example of a basic structure of a loop antenna according to a first embodiment.

In the following embodiments, the description of the same or similar portions is not repeated in principle unless particularly required.

Further, in the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Also, even when mentioning that constituent elements or the like "are made of A", "are made up of A", "have A" or "include A" in the embodiments below, elements other than A are of course not excluded except the case where it is particularly specified that A is the only element thereof. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted. In addition, hatching is used even in a plan view so as to make the drawings easy to see.

First Embodiment

FIG. 1 is a plan view illustrating one example of a basic structure of a loop antenna according to a first embodiment.

<Basic Structure of Loop Antenna>

FIG. 1 illustrates a basic structure of the loop antenna according to the first embodiment. The loop antenna 1 according to the first embodiment is used for, for example, a wireless power feeding system in a potable terminal device such as a portable telephone, namely, used when electric power is transmitted in a non-contact manner.

Here, it is needless to say that the loop antenna 1 may be used for other system (device) which wirelessly transmits a signal other than the electric power.

The structure of the loop antenna 1 shown in FIG. 1 will be described. The loop antenna 1 includes a first electrode terminal 2c to which electric power is fed, a second electrode terminal 2d which makes a pair with the first electrode terminal 2c, and a loop-shaped member (conductive wiring, antenna body) 2 which has one end connected to the first electrode terminal 2c and the other end connected to the second electrode terminal 2d, is wound a plurality of times and is made of a conductive material.

Namely, the loop-shaped member 2 is an antenna body wound a plurality of times in a looped manner, and has a structure wound twice in the first embodiment.

Further, the first electrode terminal 2c and the second electrode terminal 2d are arranged so as to make a pair with respect to a center line 3 of the loop-shaped member 2. Here, the center line 3 is a virtual center line 3 of a loop shape of the loop-shaped member 2 in a plan view. Accordingly, the loop shape of the loop-shaped member 2 is formed to be symmetrical with respect to the center line 3.

Note that the state where the first electrode terminal 2c and the second electrode terminal 2d are arranged so as to make a pair with respect to the center line 3 means that the first electrode terminal 2c and the second electrode terminal 2d are respectively arranged at symmetrical positions with the center line 3 interposed therebetween, the first electrode terminal 2c and the second electrode terminal 2d are respectively arranged at positions having the same distance from the center line 3, or the first electrode terminal 2c and the second electrode terminal 2d are respectively arranged so as to form a symmetrical shape with respect to the center line 3.

Also, the loop-shaped member 2 includes a first loop-shaped member 2a arranged on an outer side in the mutually adjacent loop-shaped members 2 and a second loop-shaped member 2b arranged on an inner side of the first loop-shaped member 2a. Namely, the loop antenna 1 shown in FIG. 1 is formed as a double loop antenna.

In addition, the loop-shaped member 2 includes an intersection part 2e at which the first loop-shaped member 2a and the second loop-shaped member 2b intersect with each other, and the intersection part 2e is arranged so as to overlap with the center line 3 in a plan view. Namely, the intersection part 2e formed by the intersection of the first loop-shaped member 2a and the second loop-shaped member 2b is arranged on the center line 3 in a plan view.

Further, the loop-shaped member 2 of the loop antenna 1 according to the first embodiment is continuously connected from the first electrode terminal 2c to the second electrode terminal 2d via the loop-shaped member 2, and its loop shape is formed to be symmetrical with respect to the virtual center line 3.

Also, the loop-shaped member 2 has a switching part 2h at which switching from the first loop-shaped member 2a to the second loop-shaped member 2b or switching from the second loop-shaped member 2b to the first loop-shaped member 2a is made in the first loop-shaped member 2a and the second loop-shaped member 2b. Note that the loop-shaped member 2 has at least two switching parts (conductive part) 2h, and the intersection part 2e is formed by a part in which the two switching parts 2h intersect with each other in a plan view.

Next, a detailed structure of the loop antenna 1 will be described.

Here, the loop antenna 1 is formed of, for example, a printed wiring substrate. The printed wiring substrate is formed of a rigid substrate in which glass fiber is impregnated with, for example, epoxy resin, polyimide resin, maleimide resin or the like. Namely, the loop antenna 1 is formed of a rigid substrate. Alternatively, a flexible substrate or a wire is also available if there is no influence on antenna efficiency or the like. Examples of the wire include a single wire, a twisted wire, a litz wire and others. The wiring which forms the antenna body is formed of, for example, copper (Cu), aluminum (Al), gold (Au) or a coated wire in which a surface of a metal wire is coated with insulating resin.

The antenna body is arranged in the rigid substrate as a loop wiring having two or more turns, and the first loop-shaped member 2a and the second loop-shaped member 2b intersect with each other near the center line 3. A cross point (the intersection part 2e) is arranged through via holes (via wiring, penetrating electrode 2f) so that a N turn wiring and a N−1 turn wiring intersect with each other so as not to be short-circuited physically and electrically. For example, in a case in which a loop wiring having two turns is provided in the first layer in a four-layer rigid substrate, four via holes penetrating from the first layer to the fourth layer are provided near the center line 3, and an outer loop wiring (the first loop-shaped member 2a) and an inner loop wiring (the second loop-shaped member 2b) are laid and connected in the second layer and the third layer.

Further, two wirings which connect the outer loop wiring and the inner loop wiring are perpendicularly arranged (intersect) in a plan view. Here, if there is no influence on characteristics, an angle between the two wirings which connect the outer wiring and the inner wiring perpendicularly arranged may not be a right angle in a plan view (the intersection with an angle other than a right angle may be adopted). The loop wiring and the cross wiring (the intersection part 2e) which connects the inner wiring and the outer wiring may be formed in any wiring layer in the rigid substrate as long as the wirings are not short-circuited physically and electrically. For example, it is possible to form the cross wirings in the first layer and the third layer and the loop wiring in the second layer, and it is also possible to form the cross wirings in the first layer and the second layer and the loop wiring in the third layer.

In other words, the other switching part (conductive part) 2ha which intersects with the switching part 2h in a plan view is formed in a wiring layer other than a surface (for example, lower wiring layer) so that the switching part 2ha connects the first loop-shaped member 2a and the second loop-shaped member 2b via a penetrating electrode (via wiring or through hole wiring) 2f.

At this time, the intersection part 2e is formed of the switching part 2h and the switching part 2ha in a plan view. Namely, the switching part 2h and the switching part 2ha can intersect with each other in a plan view by arranging the switching part 2h and the switching part 2ha respectively in the different wiring layers.

Further, in the loop antenna 1, the intersection part 2e formed of the switching part 2h and the switching part 2ha is arranged on the center line 3.

Note that the switching part 2h and the switching part 2ha may be formed in different wiring layers through the via wiring as described above, or the switching part 2h and the switching part 2ha may be formed on the surface by using a jumper wire or the like.

Further, in the loop antenna 1, the number of windings (the number of turns) is determined by a position of a transmission/reception antenna, a size of the antenna, an inductance value or the like.

In the loop antenna 1 having the structure shown in FIG. 1, in a case in which the number of the windings is an even number, the number of the intersection parts (cross point) 2e is an odd number. Also, in a case in which the number of the windings is an odd number, the number of the intersection parts (cross point) 2e is an even number.

<Specific Example of Structure of Loop Antenna>

Figure 2:
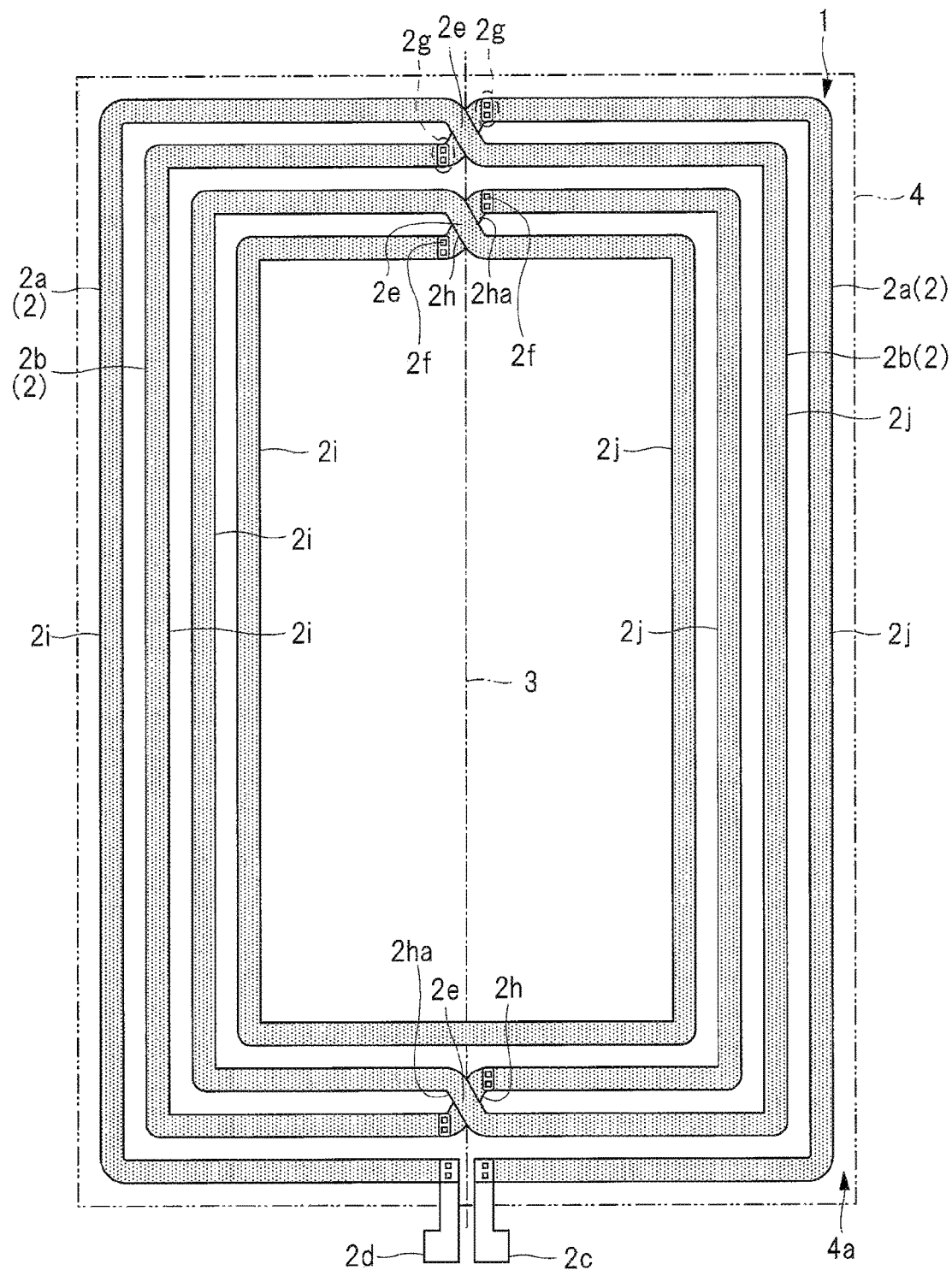
FIG. 2 is a plan view illustrating a specific example of the structure of the loop antenna according to the first embodiment.

FIG. 2 is a plan view illustrating a specific example of the structure of the loop antenna according to the first embodiment. Namely, FIG. 2 illustrates the structure of the loop antenna 1 of a specific example based on the basic structure shown in FIG. 1.

The loop antenna 1 shown in FIG. 2 shows a quad loop antenna 1 formed of wirings or the like arranged in a substrate 4 such as a rigid substrate. The structure of the loop antenna 1 shown in FIG. 2 includes the substrate 4 having a front surface (first surface) 4a, a back surface (second surface, see FIG. 10 described below) 4b opposite to the front surface 4a and the first electrode terminal 2c and the second electrode terminal 2d arranged on the front surface 4a, and the continuous loop-shaped member (conductive wiring) 2.

Also, the loop-shaped member 2 includes a first wiring 2i arranged on a left side with respect to the center line 3 and a second wiring 2j arranged on a right side with respect to the center line 3 in the loop shape as shown in FIG. 2. Further, the first wiring 2i and the second wiring 2j are formed in, for example, a wiring layer 2q shown in FIG. 8. Namely, the first wiring 2i and the second wiring 2j are formed in the same wiring layer.

Further, each of one ends of the first wiring 2i and the second wiring 2j is connected to the first electrode terminal 2c or the second electrode terminal 2d (in the antenna structure shown in FIG. 2, the first wiring 2i is connected to the second electrode terminal 2d and the second wiring 2j is connected to the first electrode terminal 2c).

As described above, the loop-shaped member 2 includes the wiring layer 2q shown in FIG. 8 in which the first wiring 2i and the second wiring 2j shown in FIG. 2 are formed, and further includes a plurality of penetrating electrodes (for example, via wiring) 2f shown in FIG. 2 which penetrate between the wiring layer 2q and a wiring layer 2r arranged below the wiring layer 2q and connect the first wiring 2i and the second wiring 2j at a position near the intersection part 2e.

Figure 8:
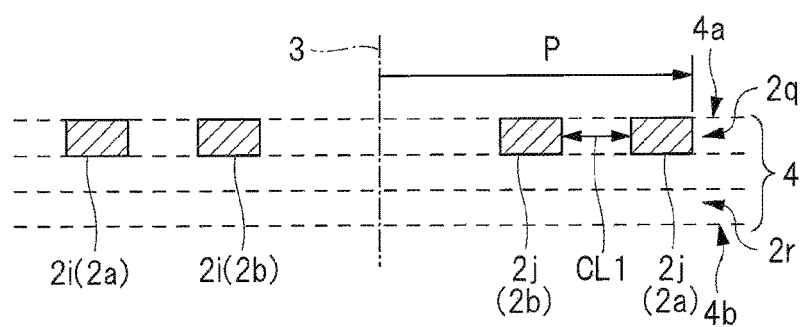
FIG. 8 is a cross-sectional view illustrating a sectional structure taken along a line A-A shown in FIG. 7.

Namely, the first wiring 2i, the second wiring 2j and the plurality of penetrating electrodes 2f are formed in the plurality of wiring layers (for example, the wiring layer 2q and the wiring layer 2r) laminated between the front surface 4a and the back surface 4b of the substrate 4 shown in FIG. 8, and one end (a part) of them is connected to the first electrode terminal 2c and the other end (a part) of them is connected to the second electrode terminal 2d.

Further, the loop-shaped member (conductive wiring) 2 is turned around at least twice along an outer periphery of the substrate 4 from the first electrode terminal 2c. In the loop antenna 1 of the specific example shown in FIG. 2, the loop-shaped member 2 is turned around four times. Namely, the quad loop antenna 1 in which the number of windings is four is formed.

In addition, the plurality of penetrating electrodes 2f include a plurality of penetrating electrode pairs 2g each having a pair of the penetrating electrodes 2f formed of two penetrating electrodes 2f. Further, at least one of the penetrating electrode pairs 2g connects the first wiring 2i and the second wiring 2j via a wiring of the wiring layer 2r shown in FIG. 8. Furthermore, the loop-shaped member 2 continuously extends via at least one of the plurality of penetrating electrode pairs 2g from the first wiring 2i to the second wiring 2j and from the second wiring 2j to the first wiring 2i.

In addition, the first electrode terminal 2c and the second electrode terminal 2d are arranged so as to make a pair along the outer periphery of the front surface 4a in a plan view.

Further, the plurality of penetrating electrode pairs 2g are arranged to face the first electrode terminal 2c and the second electrode terminal 2d making a pair in a plan view. Alternatively, each of at least two penetrating electrode pairs 2g among the plurality of penetrating electrode pairs 2g is arranged at the same distance from each of the first electrode terminal 2c and the second electrode terminal 2d making a pair. Alternatively, the plurality of penetrating electrode pairs 2g are arranged to face the first electrode terminal 2c and the second electrode terminal 2d making a pair and each of at least two penetrating electrode pairs 2g among the plurality of the penetrating electrode pairs 2g is arranged at the same distance from each of the first electrode terminal 2c and the second electrode terminal 2d making a pair.

Further, the loop-shaped member 2 as a conductive wiring has the intersection part 2e in which the switching parts (conductive part) 2h, each of which connects a pair of the penetrating electrodes 2f in each of two penetrating electrode pairs 2g among the plurality of the penetrating electrode pairs 2g, intersect with each other in a plan view.

Specifically, in the loop antenna 1 shown in FIG. 2, three penetrating electrode pairs 2g are formed, and in each of the three penetrating electrode pairs 2g, the switching part (conductive part) 2h or the switching part (conductive part)

2*ha* which connects the pair of the penetrating electrodes 2*f* forms the intersection part 2*e* with the switching part 2*ha* or the switching part 2*h*. Note that, in the antenna structure shown in FIG. 2, the switching part 2*h* or the switching part 2*ha* which connects the pair of the penetrating electrodes 2*f* in the intersection part 2*e* is formed in, for example, the wiring layer 2*r* as a lower layer shown in FIG. 8, and intersects in a plan view with the switching part 2*ha* or the switching part 2*h* formed in the wiring layer 2*q* as an upper layer.

Further, in the antenna structure shown in FIG. 2, the first wiring 2*i*, the second wiring 2*j*, and the switching part 2*h* or the switching part 2*ha* which directly connects the first wiring 2*i* and the second wiring 2*j* without using the penetrating electrode 2*f* are formed in the same wiring layer (for example, the wiring layer 2*q* shown in FIG. 8). Accordingly, also in the loop antenna 1 shown in FIG. 2, the loop shape of the loop-shaped member 2 is symmetrical with respect to the center line 3. Further, a sectional structure of the loop-shaped member 2 is also symmetrical with respect to the center line 3 like the antenna structure shown in FIG. 8.

In addition, also in the loop antenna 1 shown in FIG. 2, in a case in which the number of turns of the loop-shaped member (conductive wiring) 2 along the outer periphery of the substrate 4 is an even number, the number of the intersection parts 2*e* is an odd number. In the antenna structure shown in FIG. 2, the number of turns of the loop-shaped member 2 along the outer periphery of the substrate 4 is four, and the number of the intersection parts 2*e* at this time is three.

On the other hand, in a case in which the number of turns of the loop-shaped member 2 along the outer periphery of the substrate 4 is an odd number, the number of the intersection parts 2*e* is an even number.

Next, in the loop antenna 1 shown in FIG. 2, each of the numbers of windings (the number of turns) and the intersection parts (cross point) 2*e* and a positional relationship thereof will be described.

In a case in which the number of the windings is two (two turns), the number of the intersection parts (cross point) 2*e* on a terminal side (a side where the first electrode terminal 2*c* and the second electrode terminal 2*d* are arranged) is zero, and the number of the intersection parts 2*e* on a side opposite to the terminal side is one.

Further, in a case in which the number of the windings is three (three turns), the number of the intersection parts 2*e* on the terminal side is one, and the number of the intersection parts 2*e* on the side opposite to the terminal side is one.

Further, in a case in which the number of the windings is four (four turns) (corresponding to the structure shown in FIG. 2), the number of the intersection parts 2*e* on the terminal side is one, and the number of the intersection parts 2*e* on the side opposite to the terminal side is two.

Further, in a case in which the number of the windings is five (five turns), the number of the intersection parts 2*e* on the terminal side is two, and the number of the intersection parts 2*e* on the side opposite to the terminal side is two.

Further, in a case in which the number of the windings is six (six turns), the number of the intersection parts 2*e* on the terminal side is two, and the number of the intersection parts 2*e* on the side opposite to the terminal side is three.

Namely, when the number of the windings (the number of turns) is set to N (N is 2 or larger), N−1 intersection parts 2*e* are present on a terminal side and a position opposite to the terminal side (opposite side).

Further, in the loop antenna 1 according to the first embodiment, receiving voltage is increased as a diameter of the loop or the number of the windings becomes larger. At this time, the receiving voltage is proportional to an area A (m$^2$) of the loop antenna 1 and the number of the windings N (turns) of the loop, and it is represented by V$\alpha$=A×N (V is proportional to A and N). Accordingly, in the loop antenna 1 shown in FIG. 2, the area A and the number of the windings N are increased by turning the loop-shaped member 2 along the outer periphery of the substrate 4, thereby increasing the receiving voltage.

<Distribution of Electric Field Formed by Loop Antenna>

Figure 3:
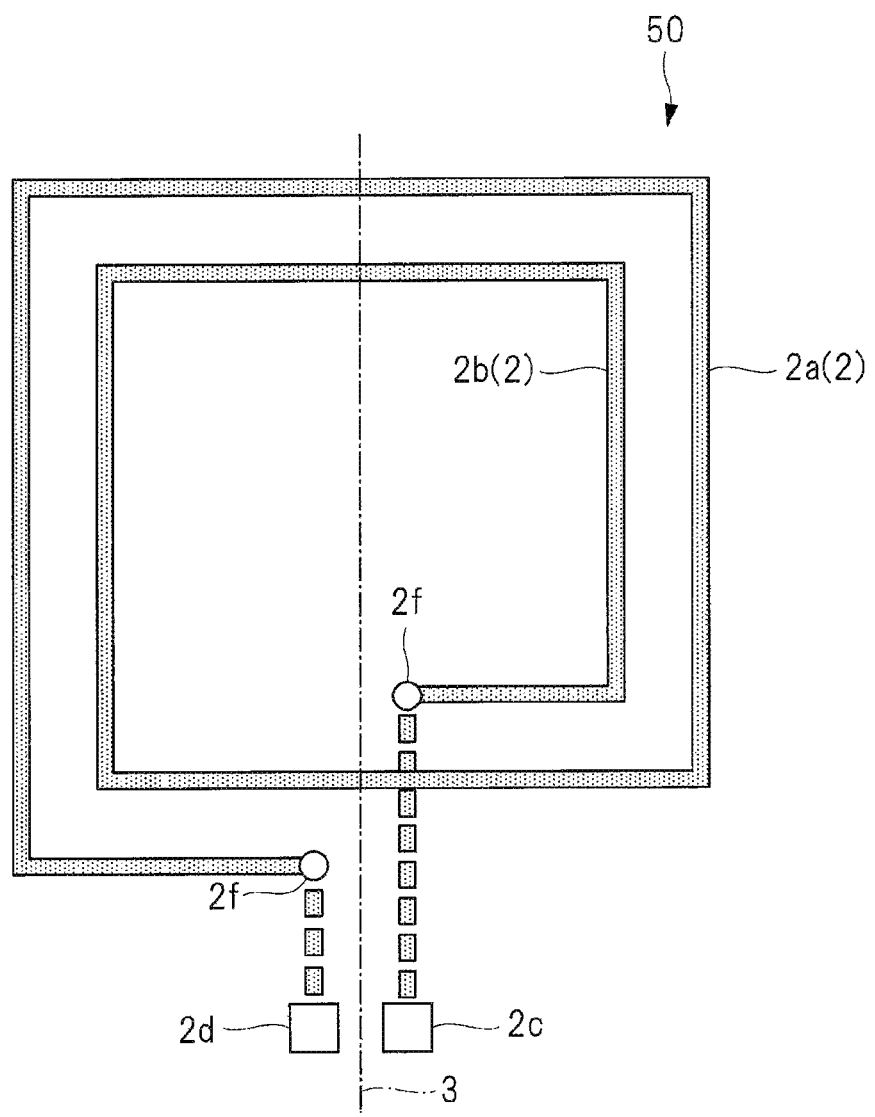
FIG. 3 is a plan view illustrating a structure of a loop antenna according to a comparative example.
Figure 4:
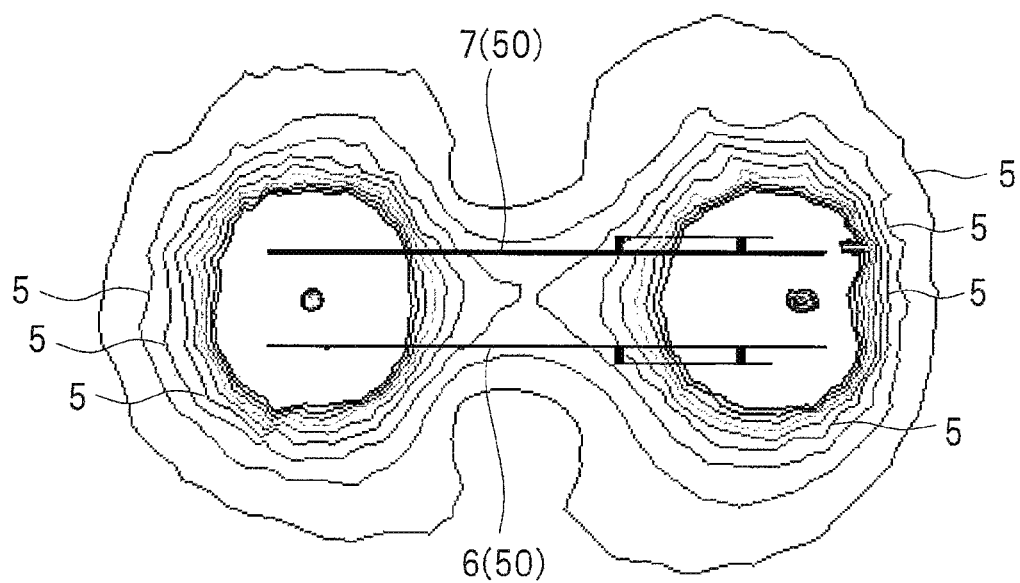
FIG. 4 is a field distribution diagram illustrating a result of a simulation regarding a field distribution state in the loop antenna according to the comparative example shown in FIG. 3.
Figure 5:
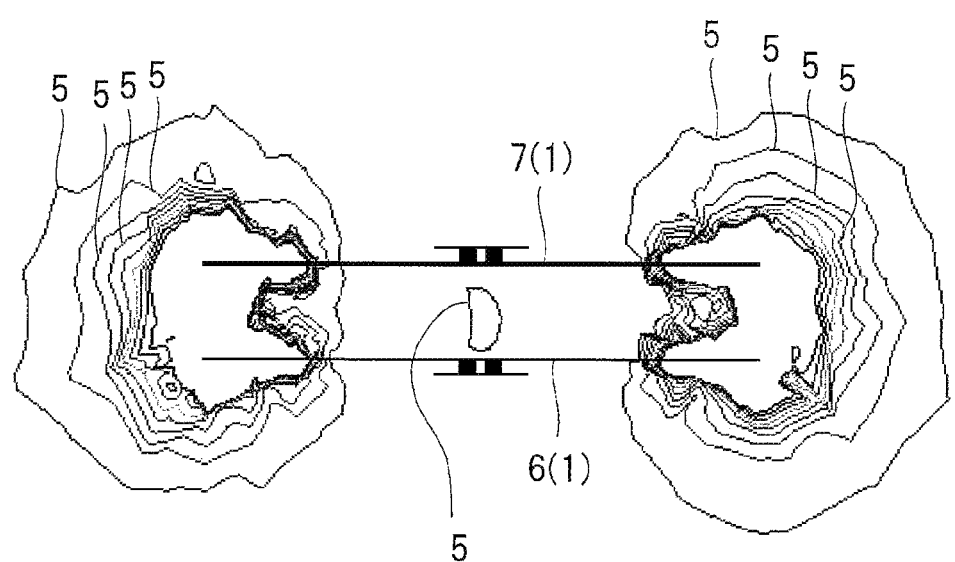
FIG. 5 is a field distribution diagram illustrating a result of a simulation regarding a field distribution state in the loop antenna shown in FIG. 2.
Figure 6:
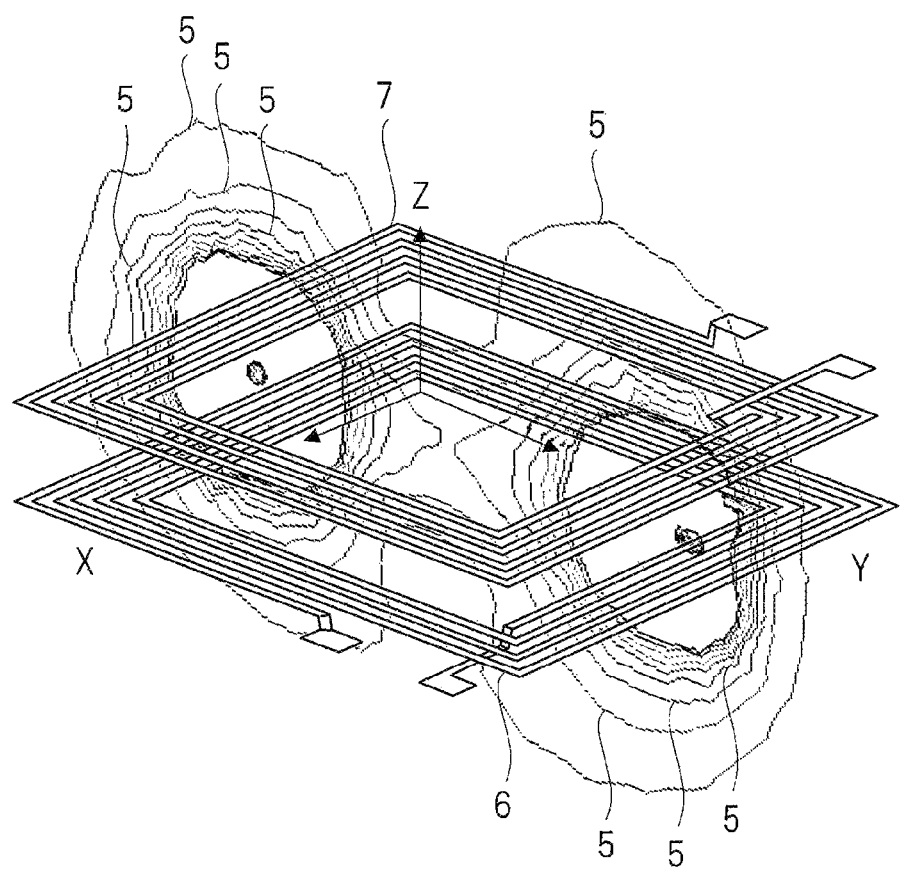
FIG. 6 is a perspective view illustrating a position of the simulation regarding the field distribution in the loop antenna.

FIG. 3 is a plan view illustrating a structure of a loop antenna according to a comparative example, FIG. 4 is a field distribution diagram illustrating a result of a simulation regarding a field distribution state in the loop antenna according to the comparative example shown in FIG. 3, FIG. 5 is a field distribution diagram illustrating a result of a simulation regarding a field distribution state in the loop antenna shown in FIG. 2, and FIG. 6 is a perspective view illustrating a position of the simulation regarding the field distribution in the loop antenna.

At first, a loop antenna 50 (comparative example) shown in FIG. 3 used for a comparative evaluation by the inventors of the present invention will be described. The loop antenna 50 has a spiral (helical) structure. Accordingly, an antenna shape in a plan view is not symmetrical with respect to the center line 3. Namely, the antenna shape is asymmetrical.

Here, in the simulation regarding the electric field distribution of the loop antenna 50 shown in FIG. 4 (the comparative example) and the loop antenna 1 shown in FIG. 5 (FIG. 2 in the first embodiment), the position of the simulation in each antenna is shown in FIG. 6. Namely, as shown in FIG. 6, in the simulation, a power transmitting side loop antenna 6 and a power receiving side loop antenna 7 are arranged to face each other, and the electric field distribution formed at positions where the loop shapes of the respective antennas face each other is simulated.

Further, as conditions of the simulation, a distance between the power transmitting antenna and the power receiving antenna is set to 5 mm, each size of the power transmitting antenna and the power receiving antenna is set to 3 mm×3 mm, and the number of the windings of each of the power transmitting antenna and the power receiving antenna is set to four.

According to a result of the simulation carried out under these conditions, when the electric field distribution of the loop antenna 50 (the comparative example) having a spiral structure shown in FIG. 4 and the electric field distribution of the loop antenna 1 having a symmetrical structure (structure shown in FIG. 2) shown in FIG. 5 are compared, it is found that a spread of the distribution of an electric field 5 around the loop antenna 1 having the symmetrical structure shown in FIG. 5 is smaller than a spread of the distribution of the electric field (magnetic field) 5 of the loop antenna 50 having the spiral structure shown in FIG. 4.

In other words, the spread of the electric field distribution of the loop antenna 1 having the symmetrical structure (structure shown in FIG. 2) shown in FIG. 5 is more uniform than the spread of the electric field distribution of the loop antenna 50 having the spiral structure shown in FIG. 4, and the spread area of the loop antenna 1 is smaller. Namely, in the loop antenna 1, the spread of the electric field (magnetic field) 5 can be suppressed.

This is because the intersection part (cross point, cross wiring) 2*e* in which the first loop-shaped member 2*a* and the second loop-shaped member 2*b* intersect with each other is arranged on the center line 3 of the loop-shaped member 2 and the shape of the loop-shaped member 2 in a plan view is formed to be symmetrical with respect to the center line 3. Thus, by adopting the antenna having the symmetrical structure shown in FIG. 1 and FIG. 2, the distribution of the electric field 5 and the magnetic field formed around the loop antenna 1 can be made uniform.

As a result, common mode current becomes small, and a noise radiated from the loop antenna 1 according to the first embodiment can be reduced.

Note that, by adopting a symmetrical structure with respect to the center line 3 in a sectional structure of the loop antenna 1, the noise can be further reduced.

Further, since the spread of the electric field (magnetic field) 5 can be suppressed by adopting the loop antenna 1, body protection for a user can be effectively improved.

<Modified Example of Loop Antenna>

Figure 7:
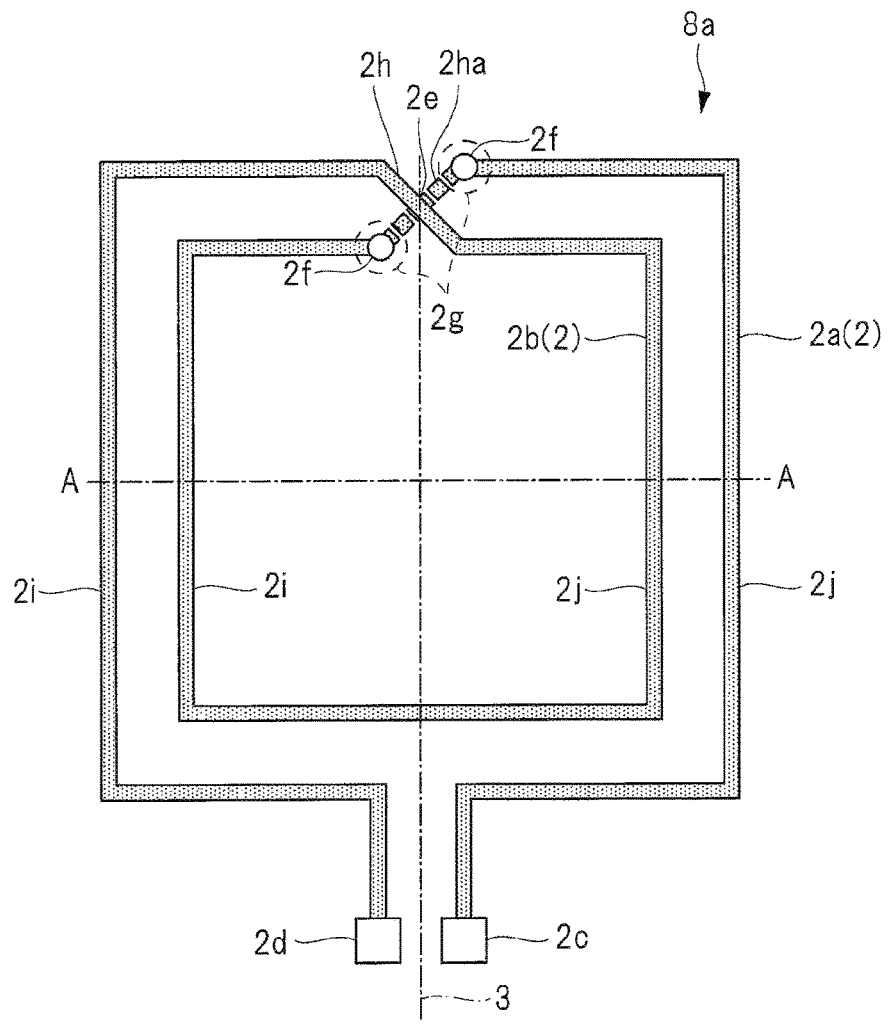
FIG. 7 is a plan view illustrating a structure of a loop antenna according to a modified example of the first embodiment.
Figure 9:
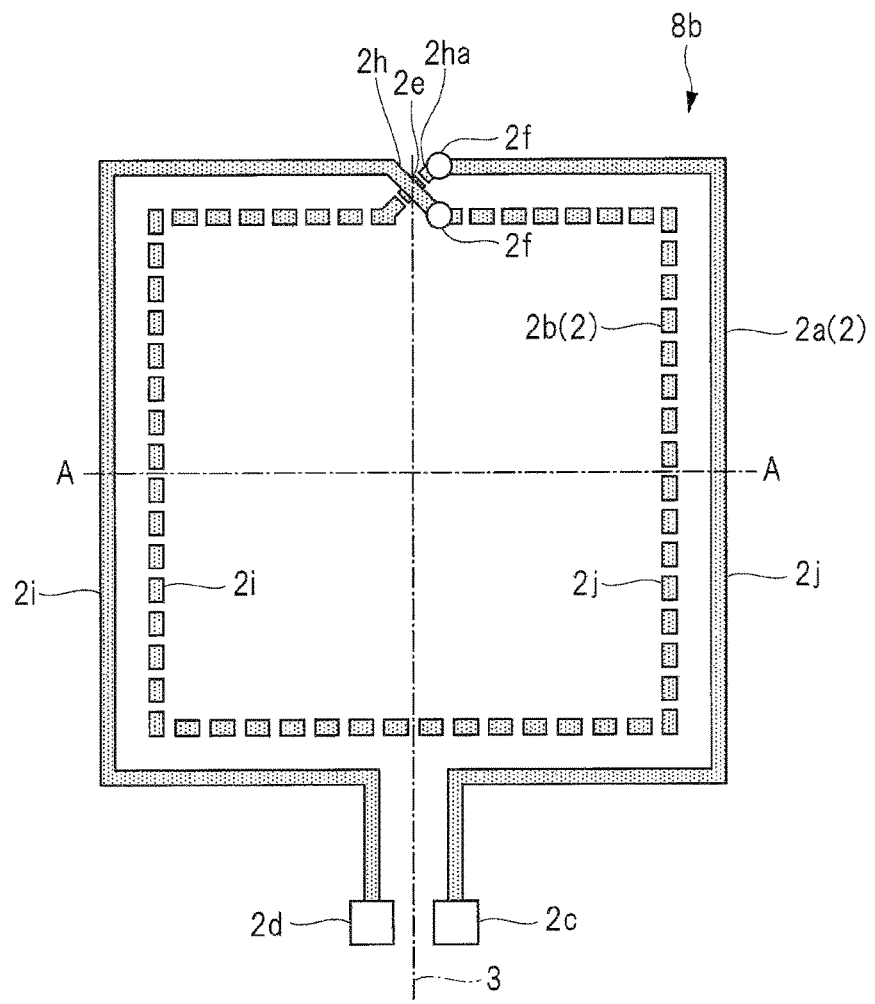
FIG. 9 is a plan view illustrating a structure of a loop antenna according to a modified example of the first embodiment.
Figure 10:
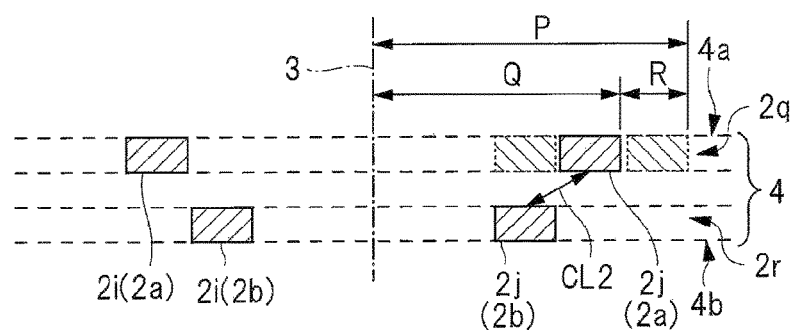
FIG. 10 is a cross-sectional view illustrating a sectional structure taken along a line A-A shown in FIG. 9.

FIG. 7 is a plan view illustrating a structure of a loop antenna according to a modified example of the first embodiment, FIG. 8 is a cross-sectional view illustrating a sectional structure taken along a line A-A shown in FIG. 7, FIG. 9 is a plan view illustrating a structure of a loop antenna according to a modified example of the first embodiment, and FIG. 10 is a cross-sectional view illustrating a sectional structure taken along a line A-A shown in FIG. 9.

A loop antenna 8a according to the modified example shown in FIG. 7 has a substantially similar shape to the loop antenna 1 shown in FIG. 1, but it has only one penetrating electrode pair 2g. Namely, in the loop antenna 8a shown in FIG. 7, a loop-shaped member 2 includes a first loop-shaped member 2a, a second loop-shaped member 2b, and an intersection part 2e, and the intersection part 2e is arranged on a virtual center line 3 in a plan view.

Note that the loop antenna 8a corresponds to the case where there is only one wiring which connects an outer wiring and an inner wiring in the intersection part 2e. Namely, one of two cross wirings (switching part 2h and switching part 2ha) which connect the outer wiring and the inner wiring may be connected to a loop wiring and may be formed in the same wiring layer in which the loop wiring is formed. Further, the two cross wirings which connect the outer wiring and the inner wiring may be connected by a jumper connection via a wire or the like.

Also, a corner part of the loop wiring (the first loop-shaped member 2a and the second loop-shaped member 2b) may be formed in any shape or any angle such as a perpendicular shape, an angle of degrees, an R-shape or the like. Further, regarding a relationship between the number of turns (the number of windings) and the number of cross points (intersection part 2e), the number of the cross points is an odd number in a case in which the number of turns is an even number, while the number of the cross points is an even number in a case in which the number of turns is an odd number.

In addition, in the loop antenna 8a shown in FIG. 7, the loop-shaped member 2 is continuously connected, and its loop shape is formed to be symmetrical with respect to the center line 3. Further, the loop-shaped member 2 includes the switching part 2h and the switching part 2ha which intersects with the switching part 2h at the intersection part 2e and is formed in a wiring layer (for example, wiring layer 2r shown in FIG. 8) different from a wiring layer (for example, wiring layer 2q shown in FIG. 8) in which the switching part 2h is formed, and the intersection part 2e is formed of the switching part 2h and the switching part 2ha.

Namely, the first loop-shaped member 2a (the first wiring 2i and the second wiring 2j), the second loop-shaped member 2b (the first wiring 2i and the second wiring 2j) and the switching part 2h are formed in the same wiring layer (for example, the wiring layer 2q shown in FIG. 8), and the switching part 2ha is formed in a different wiring layer (for example, the wiring layer 2r shown in FIG. 8) via the penetrating electrode pair 2g formed of two penetrating electrodes 2f. Here, the first loop-shaped member 2a, the second loop-shaped member 2b, the switching part 2h, the switching part 2ha, and the two penetrating electrodes 2f are continuously connected.

Note that the loop antenna 8a shown in FIG. 7 has an antenna shape in which the number of the windings is two (two turns) and the number of the intersection parts (cross point) 2e is one.

According to the loop antenna 8a shown in FIG. 7, in the first loop-shaped member 2a and the second loop-shaped member 2b, the wirings of the loop-shaped member 2 (the first wiring 2i, the second wiring 2j) can be formed in the single wiring layer 2q as shown in FIG. 8, and thus the loop antenna 8a itself can be formed thinly.

Further, since the loop shape of the loop antenna 8a is formed to be symmetrical with respect to the center line 3, the distribution of the electric field 5 and the magnetic field formed around the loop antenna 8a shown in FIG. 4 can be made uniform.

As a result, common mode current becomes small, and a noise radiated from the loop antenna 8a can be reduced.

Further, by adopting a symmetrical structure with respect to the center line 3 in a sectional structure of the loop antenna 8a, the noise can be further reduced.

Next, a loop antenna 8b according to a modified example shown in FIG. 9 has a first loop-shaped member 2a and a second loop-shaped member 2b formed in different wiring layers. At this time, switching between the wiring layers is made via a penetrating electrode 2f.

For example, the first loop-shaped member 2a (first wiring 2i and second wiring 2j) is formed in a wiring layer 2q shown in FIG. 10, and the second loop-shaped member 2b (first wiring 2i and second wiring 2j) is formed in a wiring layer 2r. At this time, a switching part 2h is formed in the wiring layer 2q, and a switching part 2ha is formed in, for example, the wiring layer 2r.

Further, also in the loop antenna 8b shown in FIG. 9, the loop-shaped member 2 is continuously connected, and its loop shape is formed to be symmetrical with respect to the center line 3. Further, as shown in FIG. 10, in a sectional structure of the antenna, for example, a symmetrical shape with respect to the center line 3 is adopted like the antenna structure shown in FIG. 8. Namely, the first loop-shaped member 2a is formed in the wiring layer 2q as an upper layer, while the second loop-shaped member 2b is formed in the wiring layer 2r as a lower layer. In this manner, a symmetrical shape with respect to the center line 3 is formed also in the sectional structure of the antenna. In addition, the loop-shaped member 2 has one intersection part 2e formed of the switching part 2h and the switching part 2ha.

Further, the loop antenna 8b shown in FIG. 9 also has an antenna shape in which the number of the windings is two (two turns) and the number of the intersection parts (cross point) 2e is one.

Namely, the loop antenna 8b corresponds to the case where the loop wiring having two turns is formed of a rigid substrate having two wiring layers, for example, a structure in which the loop wiring is formed in a first layer, one (switching part 2h) of the cross wirings is connected to the loop wiring and the other loop wiring is formed in a second layer and is connected to the loop wiring through two via holes. In this case, it is also possible to arrange the loop wirings (the first loop-shaped member 2a and the second loop-shaped member 2b) in the first layer and the second layer so as not to overlap with each other in a plan view, connect one of the cross wirings to the loop wiring, form the other cross wiring in the second layer, and connect the wiring in the first layer and the wiring in the second layer by via holes (the penetrating electrode 2f). The cross point may be formed on aside of an antenna input terminal or a side opposite to the antenna input terminal.

According to the loop antenna 8b shown in FIG. 9, since the loop shape is formed to be symmetrical with respect to the center line 3, the distribution of the electric field 5 and the magnetic field formed around the loop antenna 8b can be made uniform.

As a result, common mode current becomes small, and a noise radiated from the loop antenna 8b can be reduced.

Further, by adopting a symmetrical structure with respect to the center line 3 in a sectional structure of the loop antenna 8b, the noise can be further reduced.

Here, the antenna efficiency equal to the antenna efficiency of the loop antenna 8a shown in FIG. 7 can be acquired in the loop antenna 8b shown in FIG. 9 by making a distance between the first loop-shaped member 2a and the second loop-shaped member 2b of the loop antenna 8b equal to that of the loop antenna 8a.

At this time, since the first loop-shaped member 2a and the second loop-shaped member 2b are formed in the different wiring layers in the loop antenna 8b shown in FIG. 9, the first loop-shaped member 2a on the outer side should be arranged so that CL1 in FIG. 8 and CL2 in FIG. 10 have the relationship of CL1=CL2. Namely, in a case in which the diameters (size) of the second loop-shaped members 2b on the inner side in both antennas are made equal to each other and the relationship of CL1=CL2 is maintained, the planar diameter (size) of the first loop-shaped member 2a of the loop antenna 8b shown in FIG. 9 can be made smaller than that of the first loop-shaped member 2a of the loop antenna 8a shown in FIG. 7.

Accordingly, when a distance between the center line 3 and the outer periphery of the first loop-shaped member 2a in the loop antenna 8a shown in FIG. 7 is defined as P as shown in FIG. 8 and a distance between the center line 3 and the outer periphery of the first loop-shaped member 2a in the loop antenna 8b shown in FIG. 9 is defined as Q as shown in FIG. 10, P−Q=R holds. Therefore, in the loop antenna 8b shown in FIG. 9, the size of the loop shape of the antenna in a plan view can be reduced by twice the R (=P−Q) compared to the loop antenna 8a shown in FIG. 7.

Namely, in the loop antenna 8b shown in FIG. 9, the size of the antenna can be reduced compared to the loop antenna 8a shown in FIG. 7.

Figure 11:
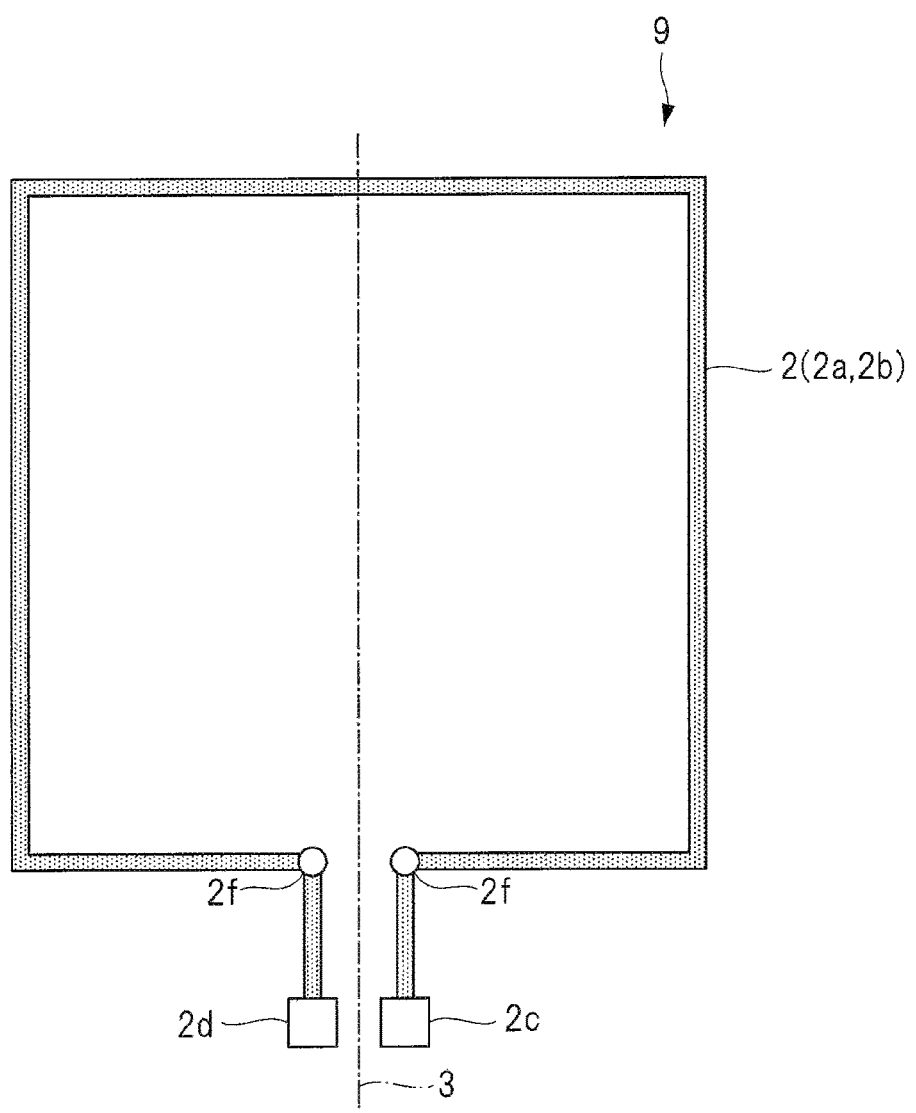
FIG. 11 is a plan view illustrating a structure of a loop antenna according to a modified example of the first embodiment.

Next, FIG. 11 is a plan view illustrating a structure of a loop antenna 9 according to a modified example of the first embodiment, and the loop antenna 9 will be described below.

In the loop antenna 9 shown in FIG. 11, a first loop-shaped member 2a and a second loop-shaped member 2b are arranged so as to overlap with each other in a plan view. Namely, the first loop-shaped member 2a and the second loop-shaped member 2b having the same size are respectively provided in different wiring layers and are arranged so as to overlap with each other in a plan view.

Accordingly, in this antenna shape, only one loop shape is visible in a plan view.

Thus, although the number of windings is two (two turns) in the loop antenna 9, no cross point is formed.

Further, also in the loop antenna 9, an antenna shape is formed to be symmetrical with respect to a center line 3, and further the first loop-shaped member 2a and the second loop-shaped member 2b are continuously connected.

In the loop antenna 9 shown in FIG. 11, since the first loop-shaped member 2a and the second loop-shaped member 2b are arranged so as to overlap with each other in a plan view, the planar size of the antenna can be further reduced compared to the loop antenna 8b shown in FIG. 9.

Figure 12:
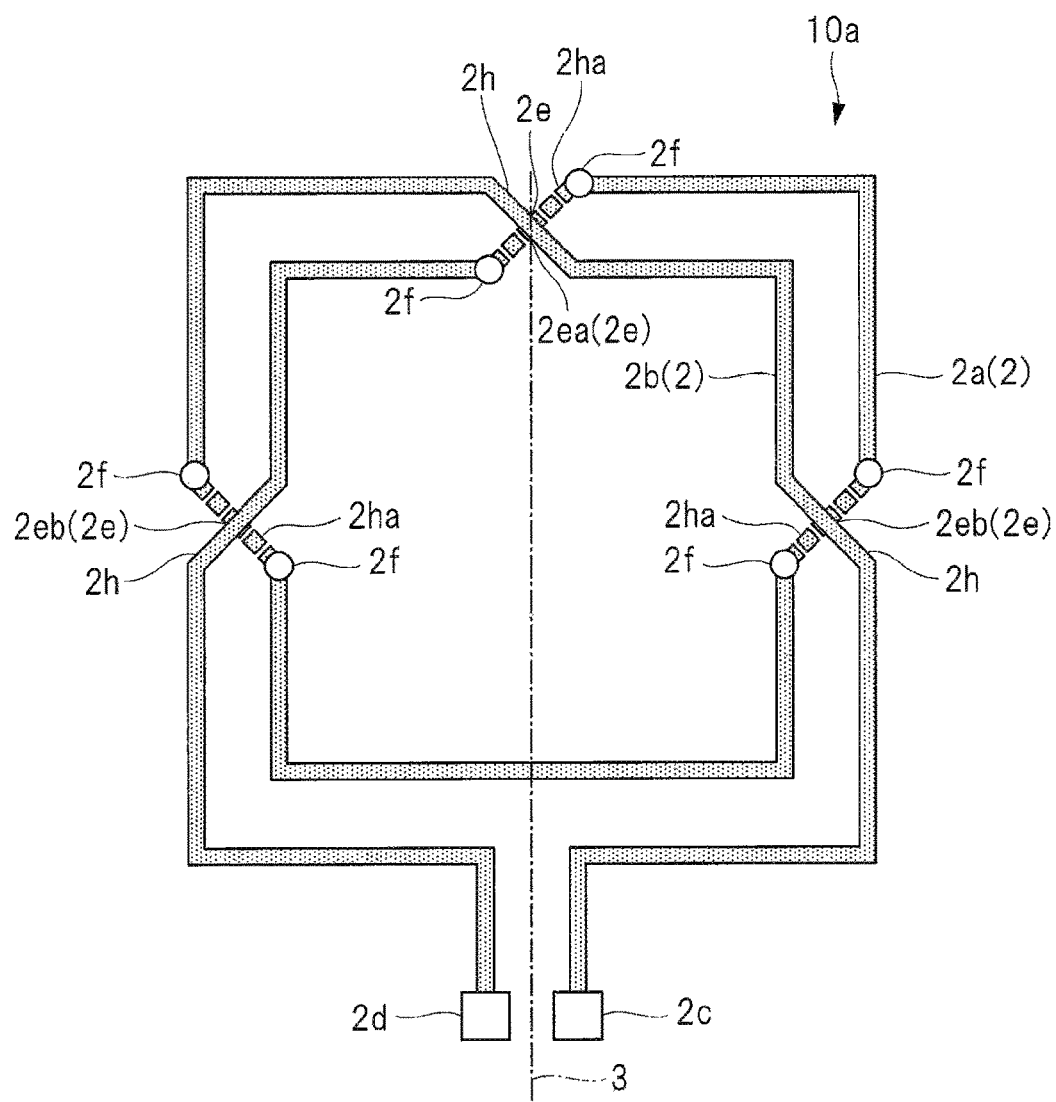
FIG. 12 is a plan view illustrating a structure of a loop antenna according to a modified example of the first embodiment.
Figure 13:
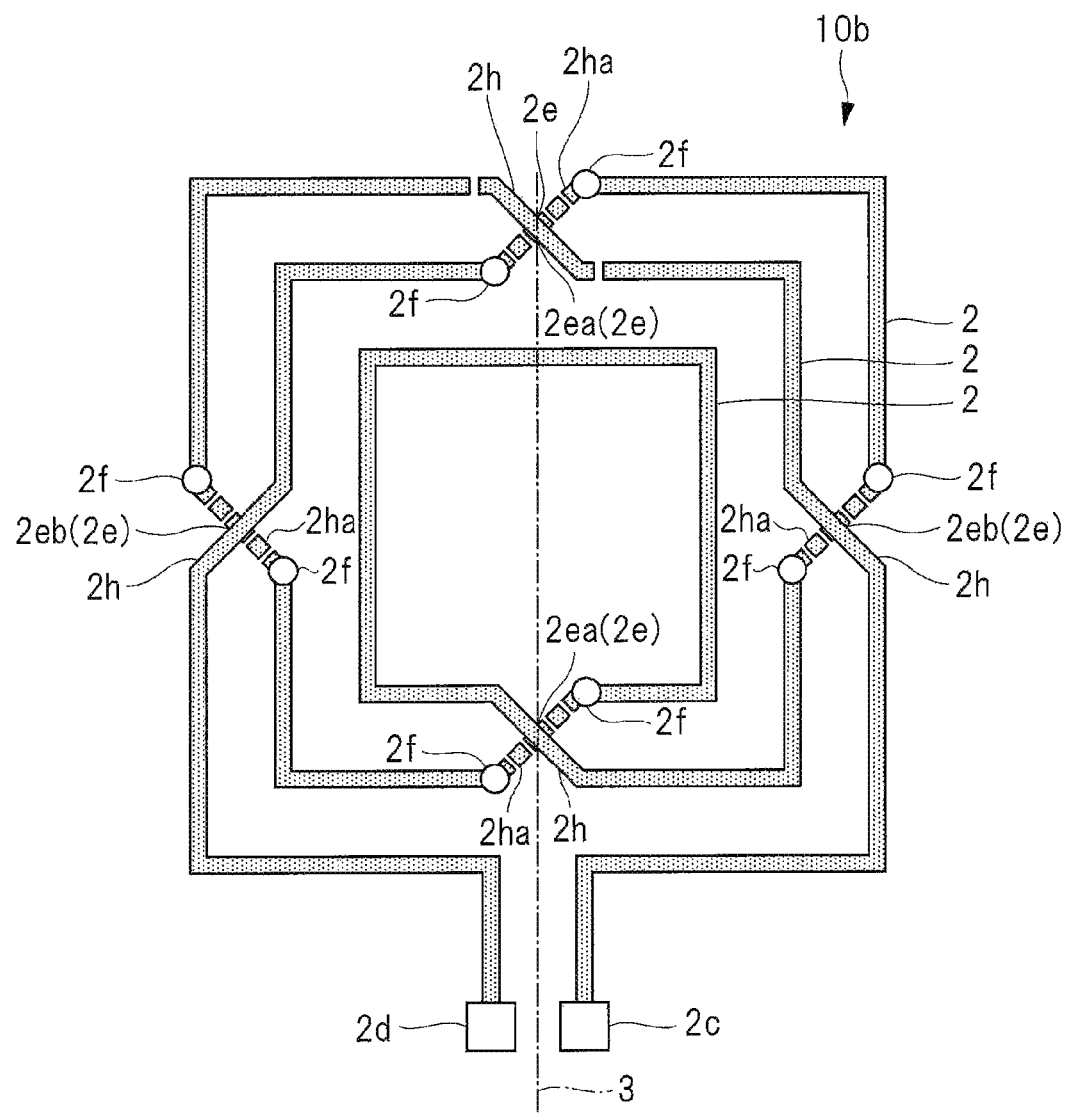
FIG. 13 is a plan view illustrating a structure of a loop antenna according to a modified example of the first embodiment.

Next, FIG. 12 and FIG. 13 are plan views respectively illustrating structures of loop antennas according to respective modified examples of the first embodiment, and antenna shapes of the modified examples shown in FIG. 12 and FIG. 13 will be described.

In a loop antenna 10a shown in FIG. 12, a loop-shaped member 2 is continuously connected, and its loop shape is formed to be symmetrical with respect to a center line 3 in a plan view.

Further, the loop-shaped member 2 includes a plurality of intersection parts 2e, and the plurality of intersection parts 2e include a first intersection part 2ea and second intersection parts 2eb.

In the antenna shape shown in FIG. 12, the first intersection part 2ea is arranged so as to overlap with the center line 3 in a plan view. On the other hand, a plurality of the second intersection parts 2eb are provided, and the second intersection parts 2eb are arranged so as to make a pair with respect to the center line 3.

Specifically, one first intersection part 2ea is arranged on the center line 3, while two second intersection parts 2eb are arranged so as to make a pair at symmetrical positions with respect to the center line 3.

Further, the loop antenna 10a shown in FIG. 12 has the antenna shape in which the number of windings is two (two turns) and the number of the intersection parts (cross point) 2e is three.

Namely, as shown in the loop antenna 10a shown in FIG. 12, in a case in which a loop wiring having two turns is formed of a rigid substrate having two wiring layers, three cross points are formed in total at respective center parts of three sides of the loop-shaped member 2 except an antenna input side.

As described above, in the loop antenna 10a shown in FIG. 12, the three intersection parts 2e are formed, so that the number of the intersection parts 2e is increased. Especially, since two second intersection parts 2eb are arranged at symmetrical positions, interval between the antenna wirings of each of the three intersection parts 2e can be shortened, and it is thus possible to shift a frequency of a generated noise to a high frequency range.

Since many electric devices are interfered when the frequency of the noise is shifted to a low frequency range, the shift to the lower frequency range is not preferable.

Therefore, the interference of the noise to other devices can be suppressed by shifting the frequency of the generated noise to the high frequency range.

Further, in a loop antenna 10b shown in FIG. 13, a loop-shaped member 2 is continuously connected, and its loop shape is formed to be symmetrical with respect to a center line 3 in a plan view. Further, the loop-shaped member 2 includes a plurality of intersection parts 2e like the antenna shape shown in FIG. 12, and the plurality of the intersection parts 2e include first intersection parts 2ea and second intersection parts 2eb.

In the antenna shape shown in FIG. 13, a plurality of the first intersection parts 2ea are provided, and the first intersection parts 2ea are arranged so as to overlap with the center line 3 in a plan view. On the other hand, a plurality of the second intersection parts 2eb are also provided, and the second intersection parts 2eb are arranged so as to make a pair with respect to the center line 3.

Specifically, two first intersection parts 2ea are arranged on the center line 3. One of the two first intersection parts 2ea is arranged on a terminal side where a first electrode terminal 2c and a second electrode terminal 2d are located, and the other one is arranged on an opposite side, namely, at a position of the opposite side far from the terminal side. Further, the two second intersection parts 2eb are arranged so as to make a pair at symmetrical positions with respect to the center line 3.

Accordingly, the loop antenna 10b shown in FIG. 13 has an antenna shape in which the number of windings is three (three turns) and the number of the intersection parts (cross point) 2e is four.

Namely, the loop antenna 10b shown in FIG. 13 corresponds to the case where the loop wiring having three turns is formed of a rigid substrate having two wiring layers, and four cross points are formed in total at respective center parts of four sides of the loop-shaped member 2.

As described above, in the loop antenna 10b shown in FIG. 13, the four intersection parts 2e are arranged to form the antenna shape in which the number of the intersection parts 2e is further increased.

Since the loop antenna 10b shown in FIG. 13 has the four intersection parts 2e and thus a part capable of shortening the interval between the antenna wirings of the respective intersection parts 2e is increased compared to the loop antenna 10a shown in FIG. 12, a frequency of the generated noise can be shifted to a further higher frequency range.

Accordingly, the interference of the noise to other devices can be further suppressed.

Further, in the loop antenna 10b shown in FIG. 13, the number of windings is increased by one compared to the antenna shape shown in FIG. 12, and thus receiving voltage can be further increased.

Figure 14:
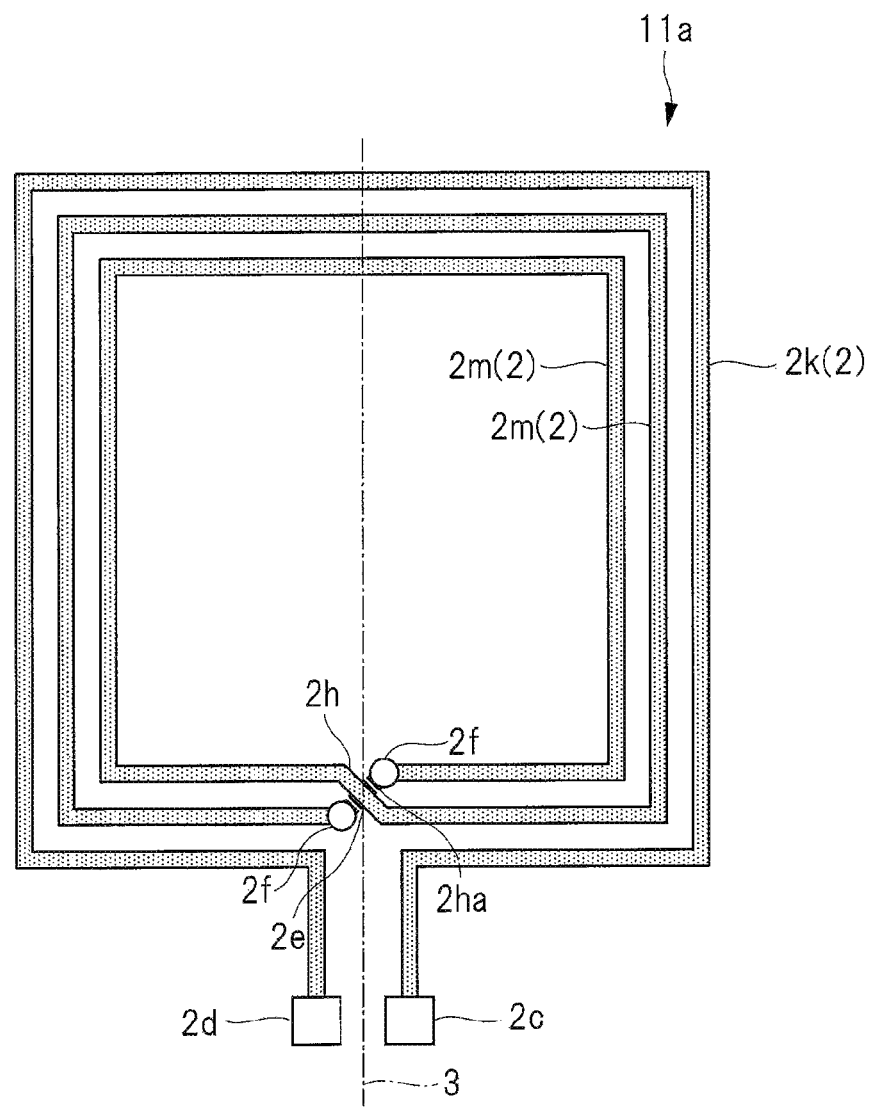
FIG. 14 is a plan view illustrating a structure of a loop antenna according to a modified example of the first embodiment.
Figure 15:
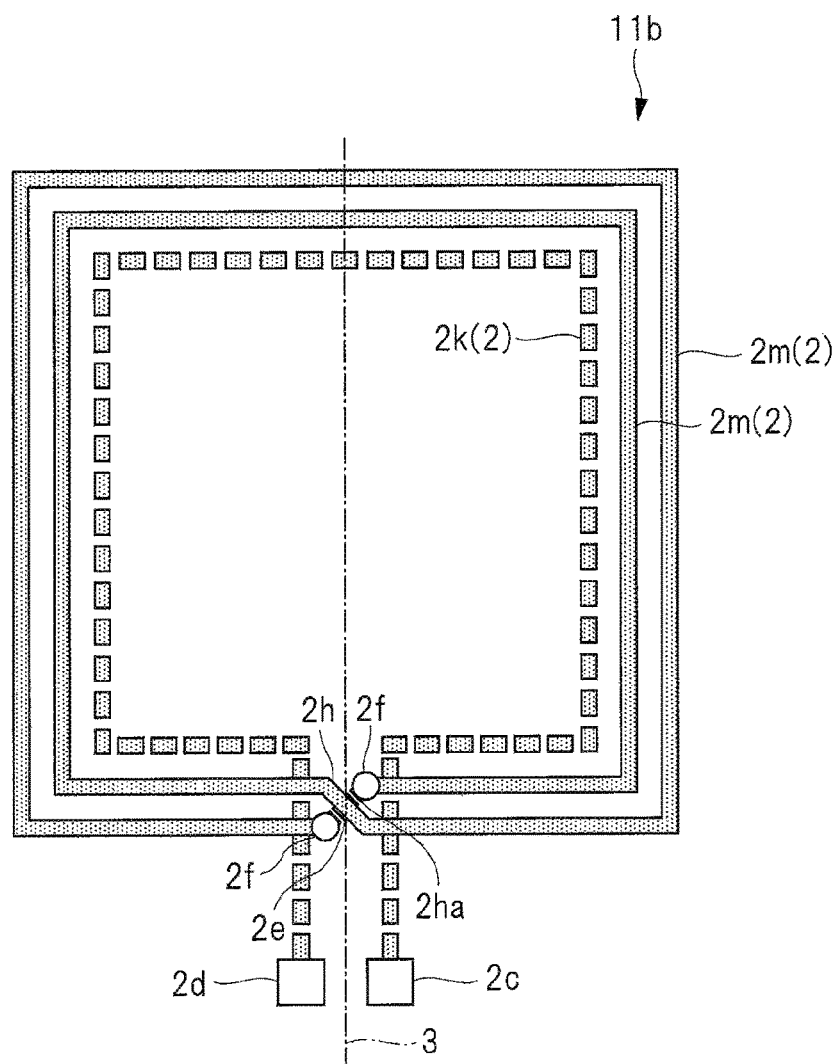
FIG. 15 is a plan view illustrating a structure of a loop antenna according to a modified example of the first embodiment.

Next, FIG. 14 and FIG. 15 are plan views respectively illustrating structures of loop antennas according to respective modified examples of the first embodiment, and antenna shapes of the modified examples shown in FIG. 14 and FIG. 15 will be described.

In a loop antenna 11a shown in FIG. 14, its loop-shaped member 2 is formed of two antennas. Namely, the loop-shaped member 2 is formed of a power feeding loop antenna 2k, which is arranged on an outermost side and feeds power, and a resonance loop antenna 2m for resonance. Note that the resonance loop antenna 2m is insulated from the power feeding loop antenna 2k, and the resonance loop antenna 2m is formed as a closed loop wiring.

Accordingly, the power feeding loop antenna 2k and the resonance loop antenna 2m are not continuously connected. However, in the loop-shaped member 2 formed of the power feeding loop antenna 2k and the resonance loop antenna 2m, its loop shape is formed to be symmetrical with respect to a center line 3 in a plan view. Further, one intersection part 2e is formed in the resonance loop antenna 2m in the loop-shaped member 2, and the intersection part 2e is arranged so as to overlap with the center line 3 in a plan view. Namely, the intersection part 2e of the resonance loop antenna 2m is arranged on the center line 3.

Note that the power feeding loop antenna 2k arranged on an outer periphery has an antenna shape in which the number of windings is one (one turn), while the resonance loop antenna 2m arranged on an inner side has an antenna shape in which the number of windings is two (two turns) and the number of the cross points is one.

Namely, the loop antenna 11a is formed of two antennas, and the closed loop wiring having one or more turns is arranged inside a loop wiring having one turn in the same layer. If there is no influence on antenna efficiency or the like, an opened loop wiring having one or more turns may be adopted. In the closed loop wiring having one or more turns, for example, the closed loop wiring having two turns shown in FIG. 14, the cross point is arranged on a side of the antenna input terminal of the loop wiring having one turn. If there is no influence on characteristics or the like, the cross point may be arranged on a side opposite to the antenna input terminal. If there is no influence on antenna efficiency or the like, the loop wiring having one turn and the closed loop wiring having one or more turns may not be formed in the same layer.

As described above, since the resonance loop antenna 2m is provided in the loop antenna 11a shown in FIG. 14, a radio wave can be amplified by using resonance at a resonance frequency, and thus the radio wave can be transmitted to a further area.

Next, in a loop antenna 11b shown in FIG. 15, its loop-shaped member 2 is formed of two antennas of a power feeding loop antenna 2k and a resonance loop antenna 2m like the antenna shape shown in FIG. 14. However, the resonance loop antenna 2m is arranged on an outer side, and the power feeding loop antenna 2k is arranged on an inner side of the resonance loop antenna 2m and is formed in a wiring layer different from a wiring layer in which the resonance loop antenna 2m is formed.

Accordingly, the resonance loop antenna 2m is insulated from the power feeding loop antenna 2k, and the resonance loop antenna 2m is formed as a closed loop wiring.

Also, the power feeding loop antenna 2k and the resonance loop antenna 2m are not continuously connected like the antenna shape shown in FIG. 14. However, also in the antenna shape shown in FIG. 15, a loop shape of the loop-shaped member 2 formed of the power feeding loop antenna 2k and the resonance loop antenna 2m is formed to be symmetrical with respect to a center line 3 in a plan view. Further, one intersection part 2e is formed in the resonance loop antenna 2m arranged on the outer side, and the intersection part 2e is arranged so as to correspond to the center line 3 in a plan view. Namely, the intersection part 2e of the resonance loop antenna 2m is arranged on the center line 3.

Also in the loop antenna 11b shown in FIG. 15, the power feeding loop antenna 2k arranged on an inner periphery has an antenna shape in which the number of windings is one (one turn), while the resonance loop antenna 2m arranged on an outer periphery has an antenna shape in which the number of windings is two (two turns) and the number of the cross points is one.

Namely, in the loop antenna 11b, the loop wiring having one turn is arranged on the inner side of the closed loop wiring having one or more turns in a plan view. In a case in which the loop wiring is formed of a rigid substrate having two wiring layers, for example, the loop wiring having one turn is arranged in a second layer, the closed loop wiring having one or more turns is arranged in a first layer, and the cross point is arranged on an antenna input side. The loop wiring having one turn in the second layer is arranged so as to overlap with the closed loop wiring in the first layer in a plan view. The cross point may be arranged on a side opposite to the antenna input side. If there is no influence on antenna efficiency or the like, the loop wiring in the second layer may be arranged so as to overlap with the closed loop wiring in the first layer in a plan view.

In the loop antenna 11b shown in FIG. 15, since the resonance loop antenna 2m is provided like the antenna shape shown in FIG. 14, a radio wave can be amplified by using resonance at a resonance frequency, and thus the radio wave can be transmitted to a further area.

Further, since the power feeding loop antenna 2k and the resonance loop antenna 2m are provided in the different wiring layers in the loop antenna 11b shown in FIG. 15, the size of the antenna can be reduced compared to the antenna shape shown in FIG. 14.

Figure 16:
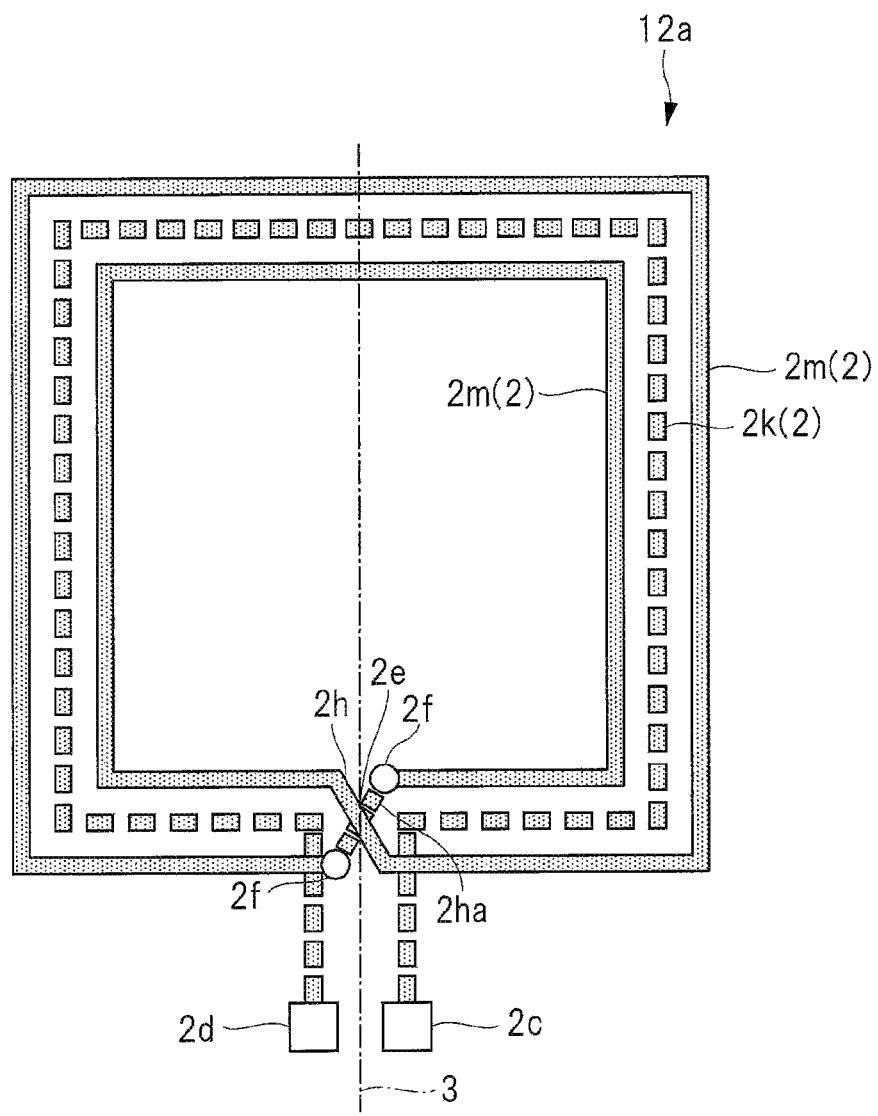
FIG. 16 is a plan view illustrating a structure of a loop antenna according to a modified example of the first embodiment.
Figure 17:
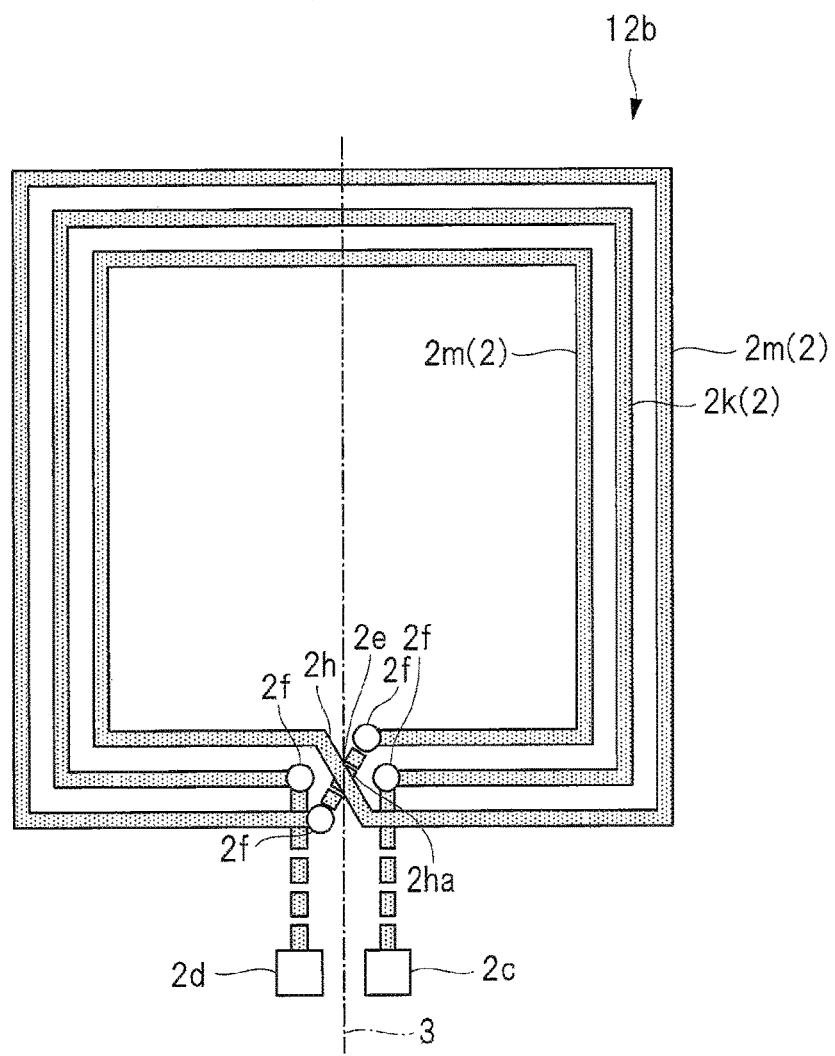
FIG. 17 is a plan view illustrating a structure of a loop antenna according to a modified example of the first embodiment.

Next, FIG. 16 and FIG. 17 are plan views respectively illustrating structures of loop antennas according to respective modified examples of the first embodiment, and antenna shapes of the modified examples shown in FIG. 16 and FIG. 17 will be described.

In a loop antenna 12a shown in FIG. 16, its loop-shaped member 2 is formed of two antennas like the antenna shape shown in FIG. 14. Namely, the loop-shaped member 2 is formed of a power feeding loop antenna 2k which feeds power and a resonance loop antenna 2m for resonance.

Here, the power feeding loop antenna 2k and the resonance loop antenna 2m are formed in different wiring layers, and the power feeding loop antenna 2k having one turn is arranged between the turns of the resonance loop antenna 2m having two turns in a plan view.

Namely, in the loop antenna 12a shown in FIG. 16, the number of windings is two (two turns) and the number of the cross points (intersection part 2e) is one in the resonance loop antenna 2m. On the other hand, the number of windings is one (one turn) in the power feeding loop antenna 2k arranged between the two antenna wirings of the resonance loop antenna 2m in a plan view.

Also in the loop antenna 12a shown in FIG. 16, the resonance loop antenna 2m is formed as a closed loop wiring and the power feeding loop antenna 2k and the resonance loop antenna 2m are not continuously connected like the antenna shape shown in FIG. 14. However, the loop-shaped member 2 formed of the power feeding loop antenna 2k and the resonance loop antenna 2m is formed to be symmetrical with respect to a center line 3 in a plan view. Further, one intersection part 2e of the resonance loop antenna 2m is arranged so as to overlap with the center line 3 in a plan view. Namely, the intersection part 2e of the resonance loop antenna 2m is arranged on the center line 3.

As described above, in the loop antenna 12a shown in FIG. 16, since the resonance loop antenna 2m is provided like the antenna shape shown in FIG. 14, a radio wave can be amplified by using resonance at a resonance frequency, and thus the radio wave can be transmitted to a further area.

Further, since the power feeding loop antenna 2k and the resonance loop antenna 2m are formed in the different wiring layers, the size of the loop antenna 12 can be reduced.

Next, also in a loop antenna 12b shown in FIG. 17, its loop-shaped member 2 is formed of two antennas like the antenna shape shown in FIG. 16. Namely, the loop-shaped member 2 is formed of a power feeding loop antenna 2k which feeds power and a resonance loop antenna 2m for resonance.

Here, the power feeding loop antenna 2k and the resonance loop antenna 2m are formed in the same wiring layer. Further, also in the loop antenna 12b shown in FIG. 17, the power feeding loop antenna 2k having one turn is arranged between the two antenna wirings of the resonance loop antenna 2m having two turns in a plan view.

Namely, also in the loop antenna 12b shown in FIG. 17, the number of windings is two (two turns) and the number of the cross points (intersection part 2e) is one in the resonance loop antenna 2m. On the other hand, the number of windings is one (one turn) in the power feeding loop antenna 2k arranged between the two antenna wirings of the resonance loop antenna 2m in a plan view.

In addition, also in the loop antenna 12b shown in FIG. 17, the resonance loop antenna 2m is formed as a closed loop wiring and the power feeding loop antenna 2k and the resonance loop antenna 2m are not continuously connected like the antenna shape shown in FIG. 14. However, the loop-shaped member 2 formed of the power feeding loop antenna 2k and the resonance loop antenna 2m is formed to be symmetrical with respect to a center line 3 in a plan view. Further, one intersection part 2e of the resonance loop antenna 2m is arranged so as to overlap with the center line 3 in a plan view. Namely, the intersection part 2e of the resonance loop antenna 2m is arranged on the center line 3.

As described above, also in the loop antenna 12b shown in FIG. 17, since the resonance loop antenna 2m is provided like the antenna shape shown in FIG. 14, a radio wave can be amplified by using resonance at a resonance frequency, and thus the radio wave can be transmitted to a further area.

Figure 18:
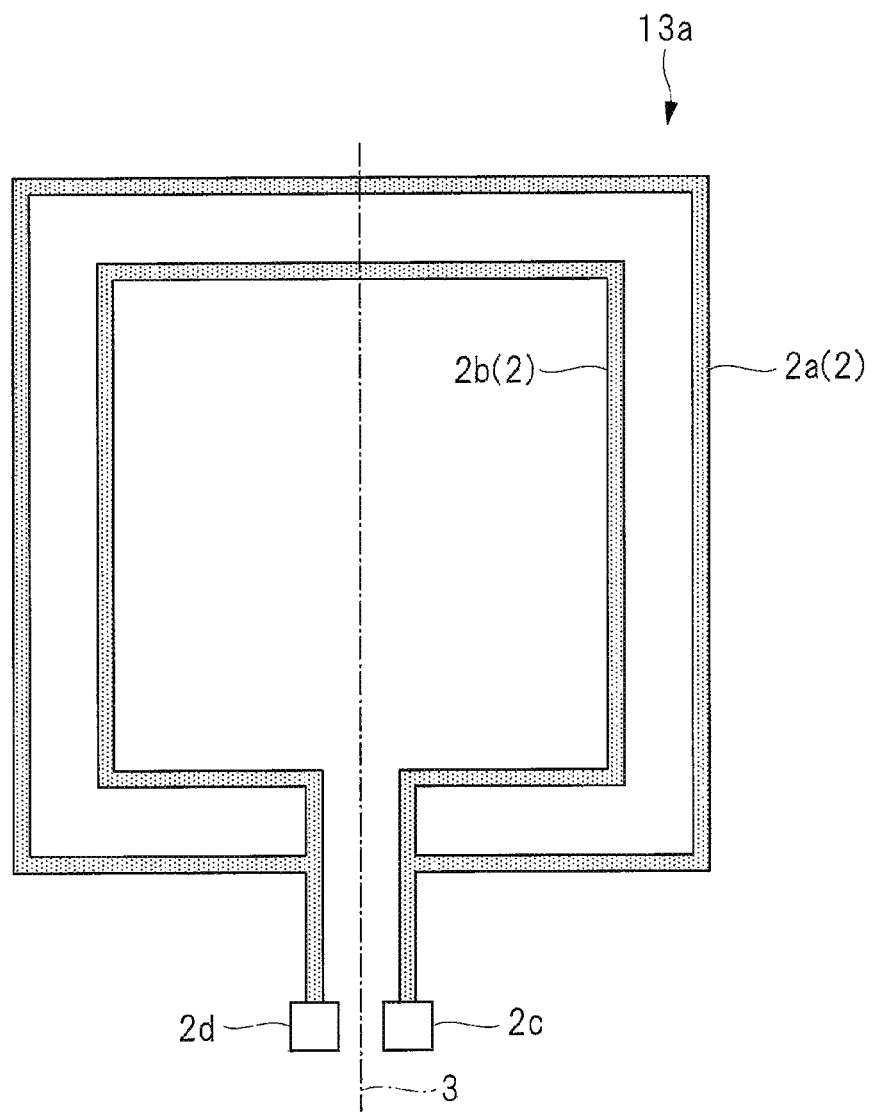
FIG. 18 is a plan view illustrating a structure of a loop antenna according to a modified example of the first embodiment.
Figure 19:
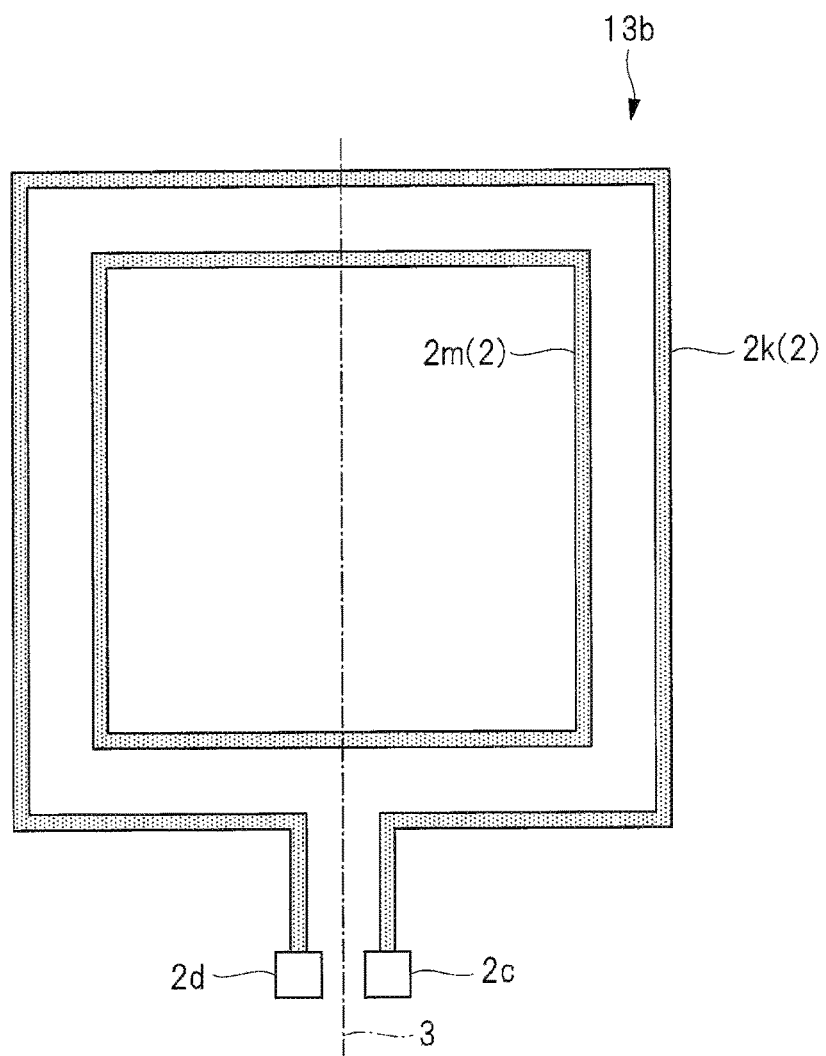
FIG. 19 is a plan view illustrating a structure of a loop antenna according to a modified example of the first embodiment.

Next, FIG. 18 and FIG. 19 are plan views respectively illustrating structures of loop antennas according to respective modified examples of the first embodiment, and antenna shapes of the modified examples shown in FIG. 18 and FIG. 19 will be described.

In a loop antenna 13a shown in FIG. 18, a loop shape of a loop-shaped member 2 formed of a first loop-shaped member 2a and a second loop-shaped member 2b is formed to be symmetrical with respect to a center line 3 in a plan view. Further, the number of windings is two (two turns) and no cross point is provided.

In the loop antenna 13a, the first loop-shaped member 2a and the second loop-shaped member 2b are formed in the same wiring layer, and the second loop-shaped member 2b arranged on an inner side is formed as a wiring branched from the first loop-shaped member 2a arranged on an outer side. Accordingly, the first loop-shaped member 2a and the second loop-shaped member 2b can be formed in the same wiring layer.

As described above, the loop antenna 13a has a structure having one antenna. Further, the first loop-shaped member 2a and the second loop-shaped member 2b are arranged so as not to overlap with each other in a plan view.

Accordingly, the loop antenna 13a can be formed in a single layer substrate having only one wiring layer, so that a thickness of the substrate including the antenna can be reduced.

Next, in a loop antenna 13b shown in FIG. 19, its loop-shaped member 2 is formed of two antennas of a power feeding loop antenna 2k and a resonance loop antenna 2m. At this time, the power feeding loop antenna 2k is arranged on an outer periphery, and the resonance loop antenna 2m is arranged on an inner side of the power feeding loop antenna 2k and is formed in the same wiring layer in which the power feeding loop antenna 2k is formed.

Namely, the power feeding loop antenna 2k and the resonance loop antenna 2m are insulated from each other, and the resonance loop antenna 2m is formed as a closed loop wiring. Accordingly, the power feeding loop antenna 2k and the resonance loop antenna 2m are not continuously connected. However, the power feeding loop antenna 2k and the resonance loop antenna 2m are formed in the same wiring layer.

Further, also in the loop antenna 13b shown in FIG. 19, a loop shape of the loop-shaped member 2 formed of the power feeding loop antenna 2k and the resonance loop antenna 2m is formed to be symmetrical with respect to a center line 3 in a plan view. However, the loop-shaped member 2 has no cross point.

Further, in the loop antenna 13b, the number of windings is one (one turn) in the power feeding loop antenna 2k arranged on the outer side, and the number of windings is also one (one turn) in the resonance loop antenna 2m arranged on the inner side.

As described above, also in the loop antenna 13b, the loop antenna 13b can be formed in a single layer substrate having only one wiring layer like the loop antenna 13a shown in FIG. 18, so that a thickness of the substrate including the antenna can be reduced.

Further, since the resonance loop antenna 2m is provided, a radio wave can be amplified by using resonance at a resonance frequency, and thus the radio wave can be transmitted to a further area.

Figure 20:
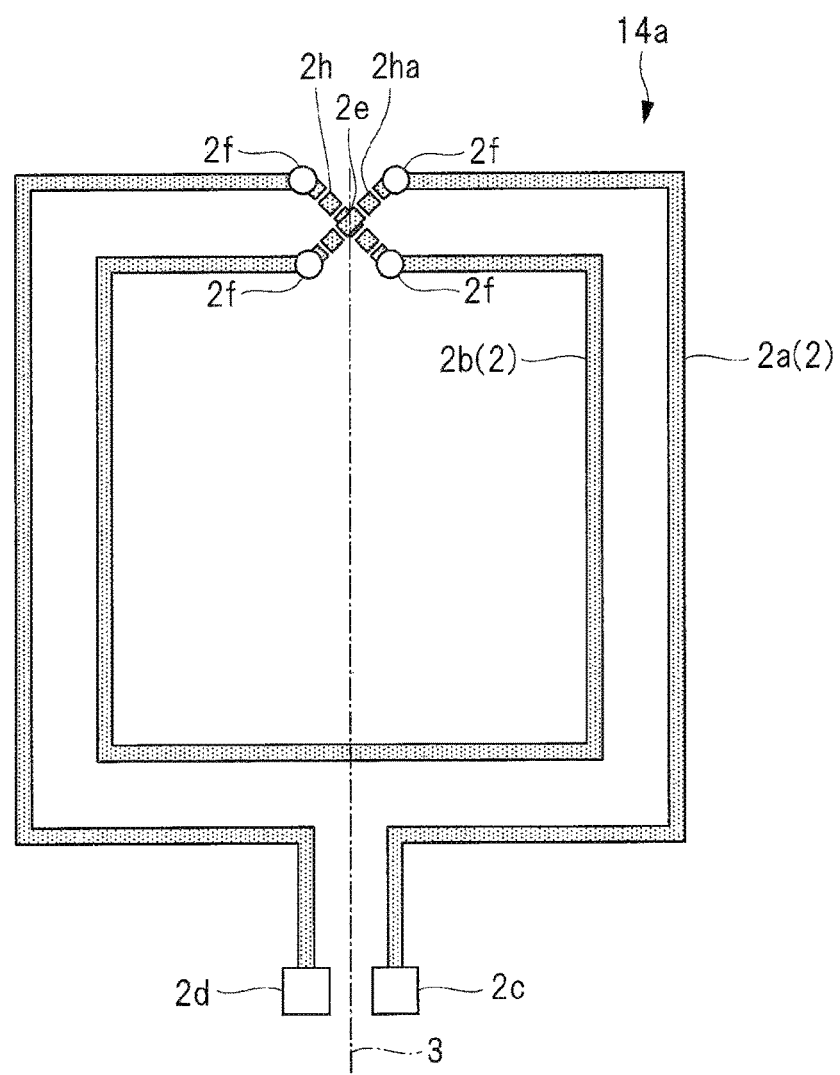
FIG. 20 is a plan view illustrating a structure of a loop antenna according to a modified example of the first embodiment.
Figure 21:
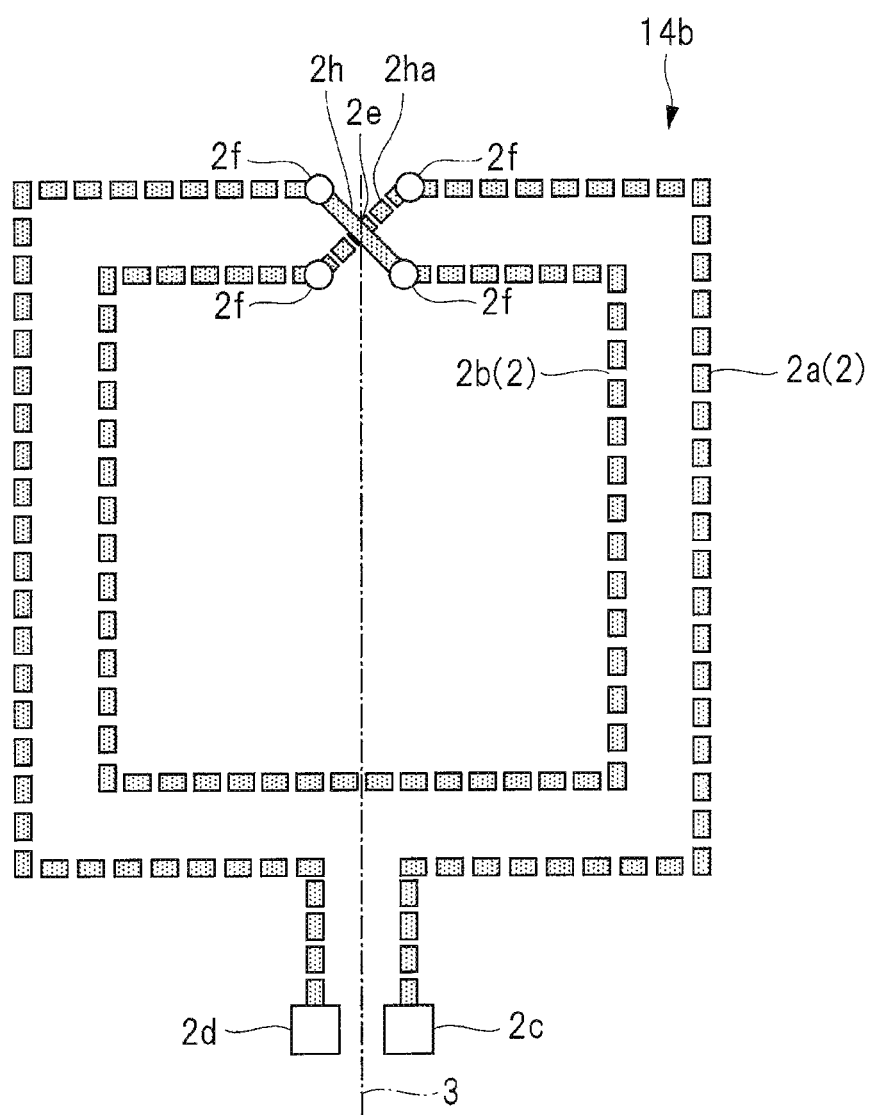
FIG. 21 is a plan view illustrating a structure of a loop antenna according to a modified example of the first embodiment.

Next, FIG. 20 and FIG. 21 are plan views respectively illustrating structures of loop antennas according to respective modified examples of the first embodiment, and antenna shapes of the modified examples shown in FIG. 20 and FIG. 21 will be described.

In a loop antenna 14a shown in FIG. 20, a loop-shaped member 2 includes a first loop-shaped member 2a, a second loop-shaped member 2b, and an intersection part 2e, and the intersection part 2e is arranged on a virtual center line 3 in a plan view. Further, the loop-shaped member 2 is continuously connected, and its loop shape is formed to be symmetrical with respect to the center line 3 in a plan view.

Further, the loop-shaped member 2 includes a switching part 2h and a switching part 2ha which intersects with the switching part 2h and is formed in a wiring layer different from a wiring layer in which the switching part 2h is formed, and the intersection part 2e is formed of the switching part 2h and the switching part 2ha.

Accordingly, in the loop-shaped member 2, the first loop-shaped member 2a and the second loop-shaped member 2b are formed in the same wiring layer, the switching part 2h is formed in another wiring layer, and the switching part 2ha is formed in still another wiring layer. Namely, an antenna shape in which the first loop-shaped member 2a and the second loop-shaped member 2b, the switching part 2h, and the switching part 2ha are formed in respectively different wiring layers is formed.

Note that the loop antenna 14a has the antenna shape in which the number of windings is two (two turns) and the number of the intersection parts (cross point) 2e is one.

Therefore, in the loop antenna 14a, for example, the first loop-shaped member 2a and the second loop-shaped member 2b, the switching part 2h, and the switching part 2ha are individually formed in three wiring layers respectively in a multi-layer substrate having four wiring layers.

According to the loop antenna 14a shown in FIG. 20, since the first loop-shaped member 2a and the second loop-shaped member 2b, the switching part 2h, and the switching part 2ha are individually formed in respectively different wiring layers, the size of the antenna can be reduced.

Next, also in a loop antenna 14b shown in FIG. 21, a first loop-shaped member 2a and a second loop-shaped member 2b are formed in the same wiring layer, a switching part 2h is formed in another wiring layer, and a switching part 2ha is formed in still another wiring layer.

Namely, like the loop antenna 14a shown in FIG. 20, an antenna shape in which the first loop-shaped member 2a and the second loop-shaped member 2b, the switching part 2h, and the switching part 2ha are formed in respectively different wiring layers is formed. For example, in the antenna shape shown in FIG. 21, the switching part 2h is formed in a first layer, the switching part 2ha is formed in a third layer, and the first loop-shaped member 2a and the second loop-shaped member 2b are formed in a second layer between the first layer and the third layer.

Namely, also in the loop antenna 14b, the first loop-shaped member 2a and the second loop-shaped member 2b, the switching part 2h, and the switching part 2ha are individually formed in respectively different wiring layers, and for example, the first loop-shaped member 2a and the second loop-shaped member 2b, the switching part 2h, and the switching part 2ha are individually formed in three wiring layers respectively in a multi-layer substrate having four wiring layers.

In addition, also in the loop antenna 14b, the loop-shaped member 2 includes an intersection part 2e in which the switching part 2h and the switching part 2ha intersect with each other in a plan view. Further, the intersection part 2e is arranged on a virtual center line 3 in a plan view.

Also, the loop-shaped member 2 is continuously connected, and its loop shape is formed to be symmetrical with respect to the center line 3.

Note that the loop antenna 14b also has an antenna shape in which the number of windings is two (two turns) and the number of the intersection parts (cross point) 2e is one.

According to the loop antenna 14b shown in FIG. 21, since the first loop-shaped member 2a and the second loop-shaped member 2b, the switching part 2h, and the switching part 2ha are individually formed in respectively different wiring layers like the loop antenna 14a shown in FIG. 20, the size of the antenna can be reduced.

Figure 22:
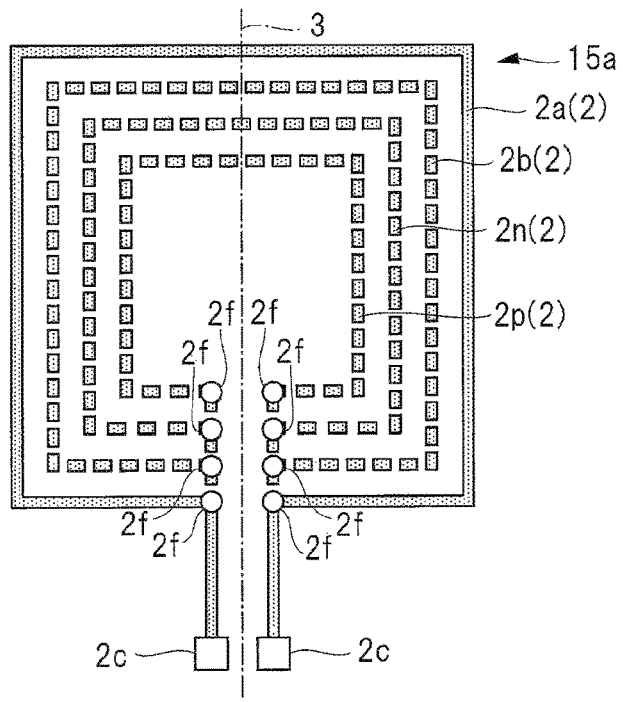
FIG. 22 is a plan view illustrating a structure of a loop antenna according to a modified example of the first embodiment.
Figure 23:
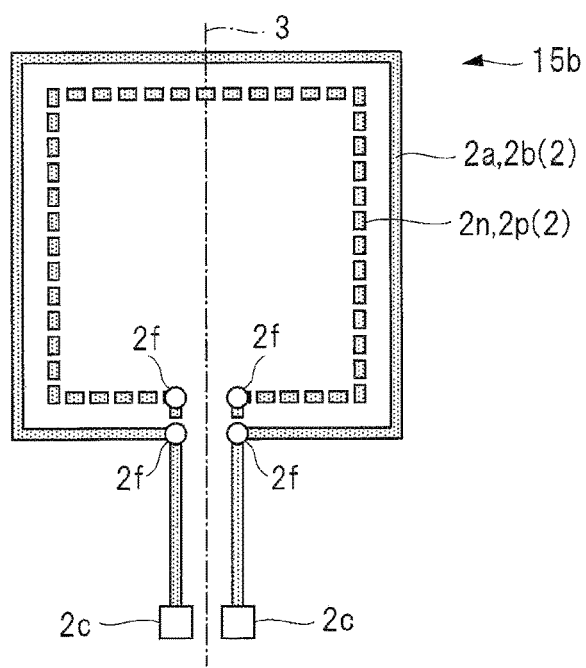
FIG. 23 is a plan view illustrating a structure of a loop antenna according to a modified example of the first embodiment.
Figure 24:
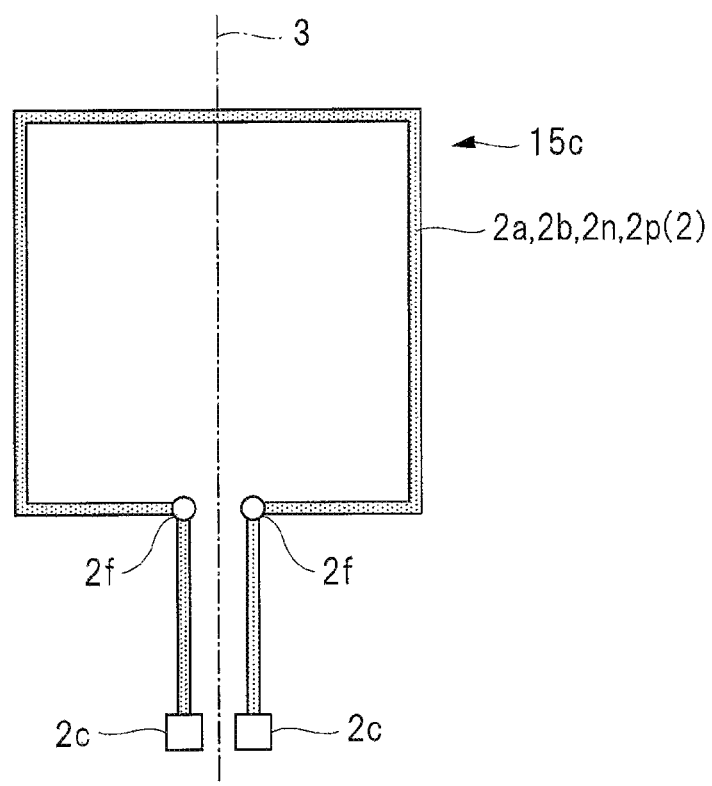
FIG. 24 is a plan view illustrating a structure of a loop antenna according to a modified example of the first embodiment.

Next, FIG. 22, FIG. 23 and FIG. 24 are plan views respectively illustrating structures of loop antennas according to respective modified examples of the first embodiment, and antenna shapes of the modified examples shown in FIG. 22, FIG. 23 and FIG. 24 will be described.

A loop antenna 15a shown in FIG. 22 has an antenna shape in which four loops are formed and the number of windings is four (four turns). Namely, a first loop-shaped member 2a, a second loop-shaped member 2b, a third loop-shaped member 2n and a fourth loop-shaped member 2p are arranged in this order from an outer side.

Further, the loop-shaped members are formed in respectively different wiring layers. For example, the first loop-shaped member 2a, the second loop-shaped member 2b, the third loop-shaped member 2n and the fourth loop-shaped member 2p are individually formed in four wiring layers respectively in a substrate having four wiring layers, and the loop-shaped members are connected (linked) with each other via a plurality of penetrating electrodes 2f.

Note that the number of windings of the loop antenna 15a is four (four turns), but the loop antenna 15a has no cross point.

Further, also in the loop antenna 15a, an antenna shape of a loop-shaped member 2 is formed to be symmetrical with respect to a center line 3.

In the loop antenna 15a shown in FIG. 22, since the number of windings is increased, receiving voltage can be increased.

Further, since the loop-shaped members are individually formed in the four wiring layers respectively, a planar size of the antenna can be reduced.

Next, a loop antenna 15b shown in FIG. 23 has an antenna shape in which four loops are formed and the number of windings is four (four turns) like the loop antenna 15a shown in FIG. 22.

However, a first loop-shaped member 2a and a second loop-shaped member 2b are made to have the same size and are arranged so as to overlap with each other, and a third loop-shaped member 2n and a fourth loop-shaped member 2p are similarly made to have the same size and are arranged so as to overlap with each other on an inner side of the first loop-shaped member 2a and the second loop-shaped member 2b. Accordingly, although two loops are visible in a plan view, the loop-shaped members are individually formed in four wiring layers respectively and are connected to each other via penetrating electrodes 2f.

Namely, the loop antenna 15b is also formed in, for example, a substrate having four wiring layers. Further, also in the loop antenna 15b, an antenna shape of a loop-shaped member 2 is formed to be symmetrical with respect to a center line 3.

Also in the loop antenna 15b shown in FIG. 23, since the number of windings is increased, receiving voltage can be increased.

Further, since the loop-shaped members are individually formed in the four wiring layers, a planar size of the antenna can be reduced.

In addition, since two loop-shaped members have the same size and are arranged so as to overlap with each other, the planar size of the loop antenna 15b can be reduced compared to the loop antenna 15a shown in FIG. 22.

Next, in a loop antenna 15c shown in FIG. 24, a first loop-shaped member 2a, a second loop-shaped member 2b, a third loop-shaped member 2n and a fourth loop-shaped member 2p are made to have the same size and the four loop-shaped members are arranged so as to overlap with each other in a plan view. Namely, the first loop-shaped member 2a, the second loop-shaped member 2b, the third loop-shaped member 2n and the fourth loop-shaped member 2p having the same size are individually formed in four wiring layers respectively and are arranged so as to overlap with each other in a plan view.

Accordingly, an antenna shape in which only one loop shape is visible in a plan view is formed.

Consequently, also in the loop antenna 15c, the number of windings is four (four turns). Further, the antenna shape is formed to be symmetrical with respect to a center line 3.

Further, the loop antenna 15c is also formed in, for example, a substrate having four wiring layers.

As described above, the loop antenna 15c has no cross point, and the loop-shaped members are connected with each other through via wirings (penetrating electrode 2f) on an antenna input terminal side, and are arranged so as to overlap with each other in a plan view.

Also in the loop antenna 15c shown in FIG. 24, since the number of windings is increased, receiving voltage can be increased.

Further, since the loop-shaped members are individually formed in the four wiring layers respectively, a planar size of the antenna can be reduced.

Further, since the four loop-shaped members are made to have the same size and are arranged so as to overlap with each other, a planar size of the loop antenna 15c can be reduced compared to the loop antenna 15a shown in FIG. 22 and the loop antenna 15b shown in FIG. 23.

Figure 25:
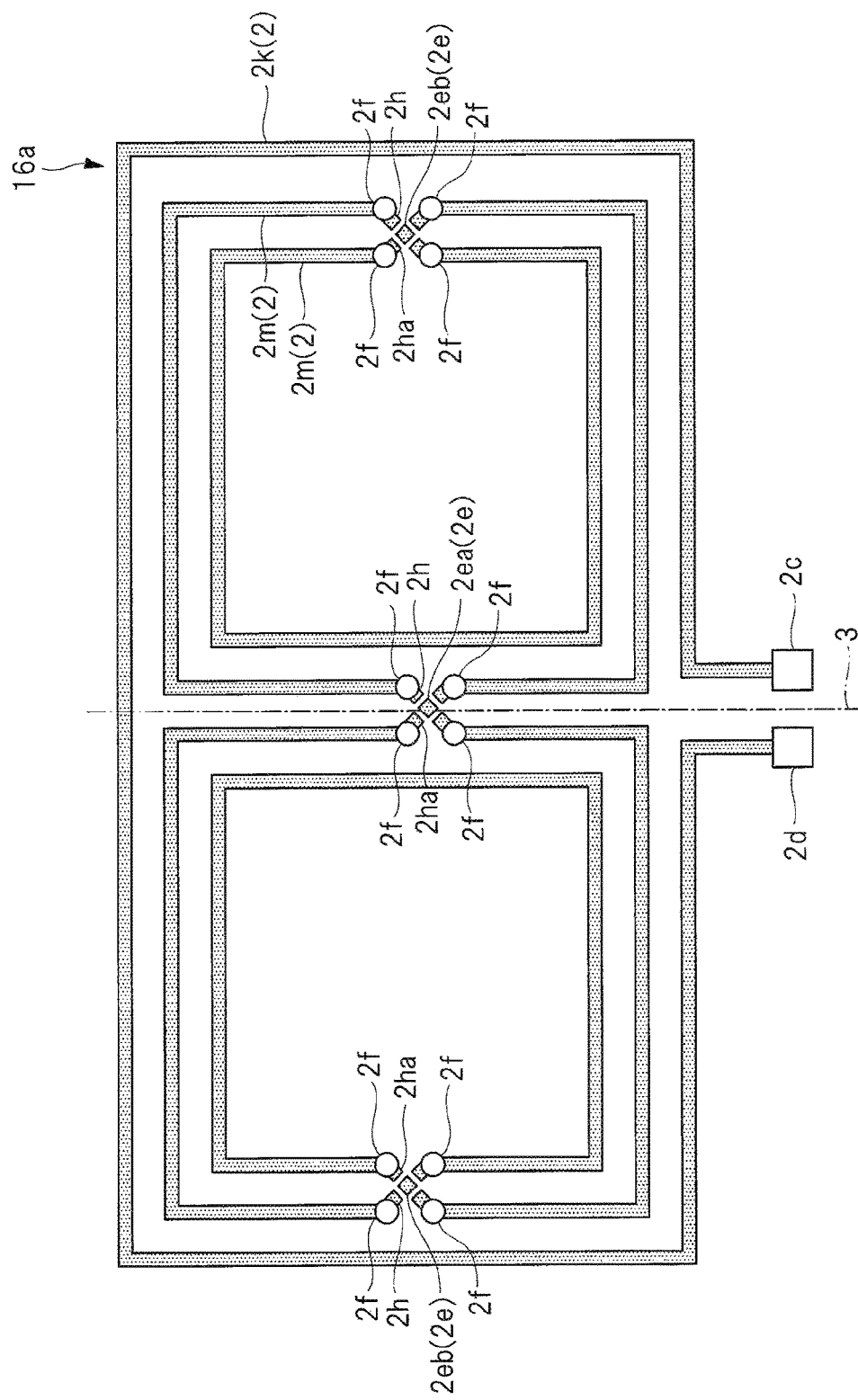
FIG. 25 is a plan view illustrating a structure of a loop antenna according to a modified example of the first embodiment.
Figure 26:
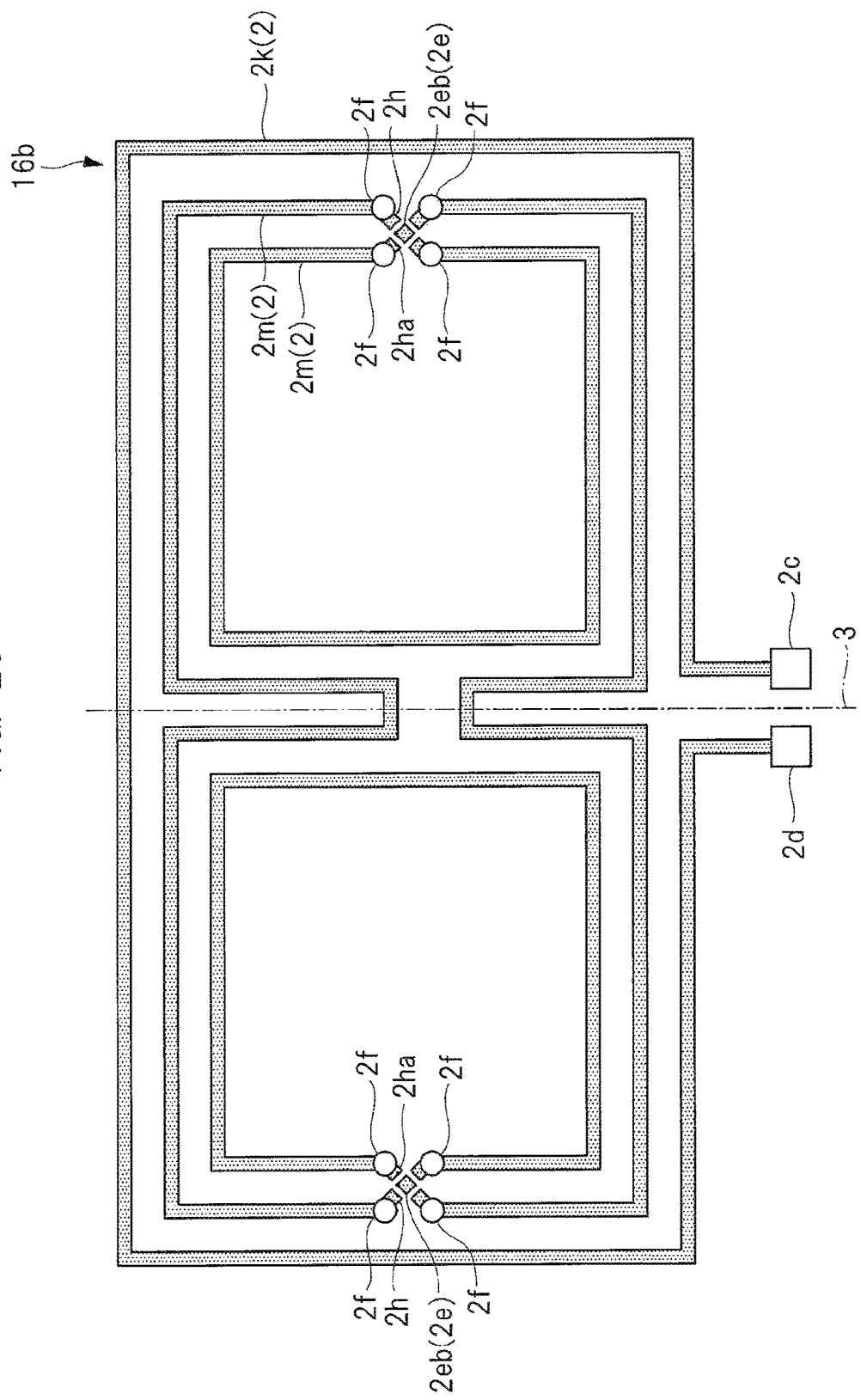
FIG. 26 is a plan view illustrating a structure of a loop antenna according to a modified example of the first embodiment.

Next, FIG. 25 and FIG. 26 are plan views respectively illustrating structures of loop antennas according to respective modified examples of the first embodiment, and antenna shapes of the modified examples shown in FIG. 25 and FIG. 26 will be described.

In a loop antenna 16a shown in FIG. 25, its loop-shaped member 2 is formed of two antennas. Namely, the loop-shaped member 2 is formed of a power feeding loop antenna 2k, which is arranged on an outermost side and feeds power, and a resonance loop antenna 2m for resonance arranged on an inner side of the power feeding loop antenna 2m. Note that the resonance loop antenna 2m is insulated from the power feeding loop antenna 2k, and the resonance loop antenna 2m is formed as a closed loop wiring.

Accordingly, the power feeding loop antenna 2k and the resonance loop antenna 2m are not continuously connected. However, in the loop-shaped member 2 formed of the power feeding loop antenna 2k and the resonance loop antenna 2m, its loop shape is formed to be symmetrical with respect to a center line 3 in a plan view. Further, three intersection parts 2e are formed in the resonance loop antenna 2m in the loop-shaped member 2, and a first intersection part 2ea among the three intersection parts 2e is arranged so as to overlap with the center line 3 in a plan view. Namely, the first intersection part 2ea of the resonance loop antenna 2m is arranged on the center line 3. On the other hand, the other two intersection parts 2e among the three intersection parts 2e are formed as second intersection parts 2eb arranged at symmetrical positions with respect to the center line 3.

Note that the number of windings is one (one turn) in the power feeding loop antenna 2k arranged on an outer periphery, while the number of windings is two (two turns) and the number of the cross points (intersection part 2e) is three in the resonance loop antenna 2m arranged on the inner side.

Further, the power feeding loop antenna 2k and the resonance loop antenna 2m are formed in the same wiring layer, and a switching part 2h and a switching part 2ha which intersect with each other in a plan view to form the intersection part 2e are formed in respectively different wiring layers. Accordingly, the power feeding loop antenna 2k and the resonance loop antenna 2m, the switching part 2h, and the switching part 2ha are individually formed in three wiring layers respectively in a substrate having four wiring layers.

Further, in the loop antenna 16a, the resonance loop antenna 2m arranged on the inner side of the power feeding loop antenna 2k has respective loop shapes at symmetrical positions with respect to a center line 3. Namely, the resonance loop antenna 2m has loop shapes of two turns at symmetrical positions with respect to the center line 3 on the inner side of the power feeding loop antenna 2k.

In the loop antenna 16a, the first intersection part 2ea is arranged on the center line 3, and thus the loop antenna 16a is divided by the first intersection part 2ea into two regions with the center line 3 interposed therebetween.

Accordingly, since the region of the loop-shaped member 2 of the loop antenna 16a is divided into two regions, current applied to the loop antenna 16a can be reduced.

As a result, power consumption of the loop antenna 16a can be reduced.

Further, since the resonance loop antenna 2m is provided also in the loop antenna 16a, a radio wave can be amplified by using resonance at a resonance frequency, and thus the radio wave can be transmitted to a further area.

Next, in a loop antenna 16b shown in FIG. 26, its loop-shaped member 2 is formed of two antennas like the loop antenna 16a shown in FIG. 25. Namely, the loop-shaped member 2 is formed of a power feeding loop antenna 2k, which is arranged on an outermost side and feeds power, and a resonance loop antenna 2m for resonance arranged on an inner side of the power feeding loop antenna 2m. Note that the resonance loop antenna 2m is insulated from the power feeding loop antenna 2k, and the resonance loop antenna 2m is formed as a closed loop wiring.

Accordingly, the power feeding loop antenna 2k and the resonance loop antenna 2m are not continuously connected. However, in the loop-shaped member 2 formed of the power feeding loop antenna 2k and the resonance loop antenna 2m, its loop shape is formed to be symmetrical with respect to a center line 3 in a plan view. Further, in the loop antenna 16b, two intersection parts 2e are formed in the resonance loop antenna 2m in the loop-shaped member 2, and these two intersection parts 2e are formed as second intersection parts 2eb arranged at symmetrical positions with respect to the center line 3.

Here, in the loop antenna 16b, no cross point is arranged on the center line 3.

Further, the number of windings is one (one turn) in the power feeding loop antenna 2k arranged on an outer periphery, while the number of windings is two (two turns) and two cross points (intersection part 2e) are provided in the resonance loop antenna 2m arranged on an inner side.

In addition, like the loop antenna 16a shown in FIG. 25, the power feeding loop antenna 2k and the resonance loop antenna 2m are formed in the same wiring layer, and a switching part 2h and a switching part 2ha which intersect with each other in a plan view to form the intersection part 2e are formed in respectively different wiring layers. Namely, the power feeding loop antenna 2k and the resonance loop antenna 2m, the switching part 2h, and the switching part 2ha are individually formed in three wiring layers respectively in a substrate having four wiring layers.

Further, in the loop antenna 16b, like the loop antenna 16a, the resonance loop antenna 2m arranged on the inner side of the power feeding loop antenna 2k has respective loop shapes at symmetrical positions with respect to a center line 3. Namely, the resonance loop antenna 2m has loop shapes of two turns at symmetrical positions with respect to the center line 3 on the inner side of the power feeding loop antenna 2k.

However, since no cross point is arranged on the center line 3 in the loop antenna 16b, the loop shapes of two turns formed on the right and left sides with respect to the center line 3 seem to form one region.

Accordingly, since a distance between the one second intersection part 2eb and the other second intersection part 2eb is long, current applied to the loop antenna 16b becomes larger. Therefore, a whole magnetic field of the loop antenna 16b can be strengthened, and thus a large power feeding area can be secured.

Further, also in the loop antenna 16b, since the resonance loop antenna 2m is provided, a radio wave can be amplified by using resonance at a resonance frequency, and thus the radio wave can be transmitted to a further area.

As described above, also in the loop antennas according to all of the modified examples, the spread of electric field (magnetic field) 5 can be suppressed by forming the antenna shape to be symmetrical, and it is thus possible to reduce the noise radiated from the loop antenna.

Further, since the spread of the electric field (magnetic field) 5 can be suppressed, body protection for a user can be effectively improved.

Second Embodiment

<Configuration of Wireless Power Feeding System>

Figure 27:
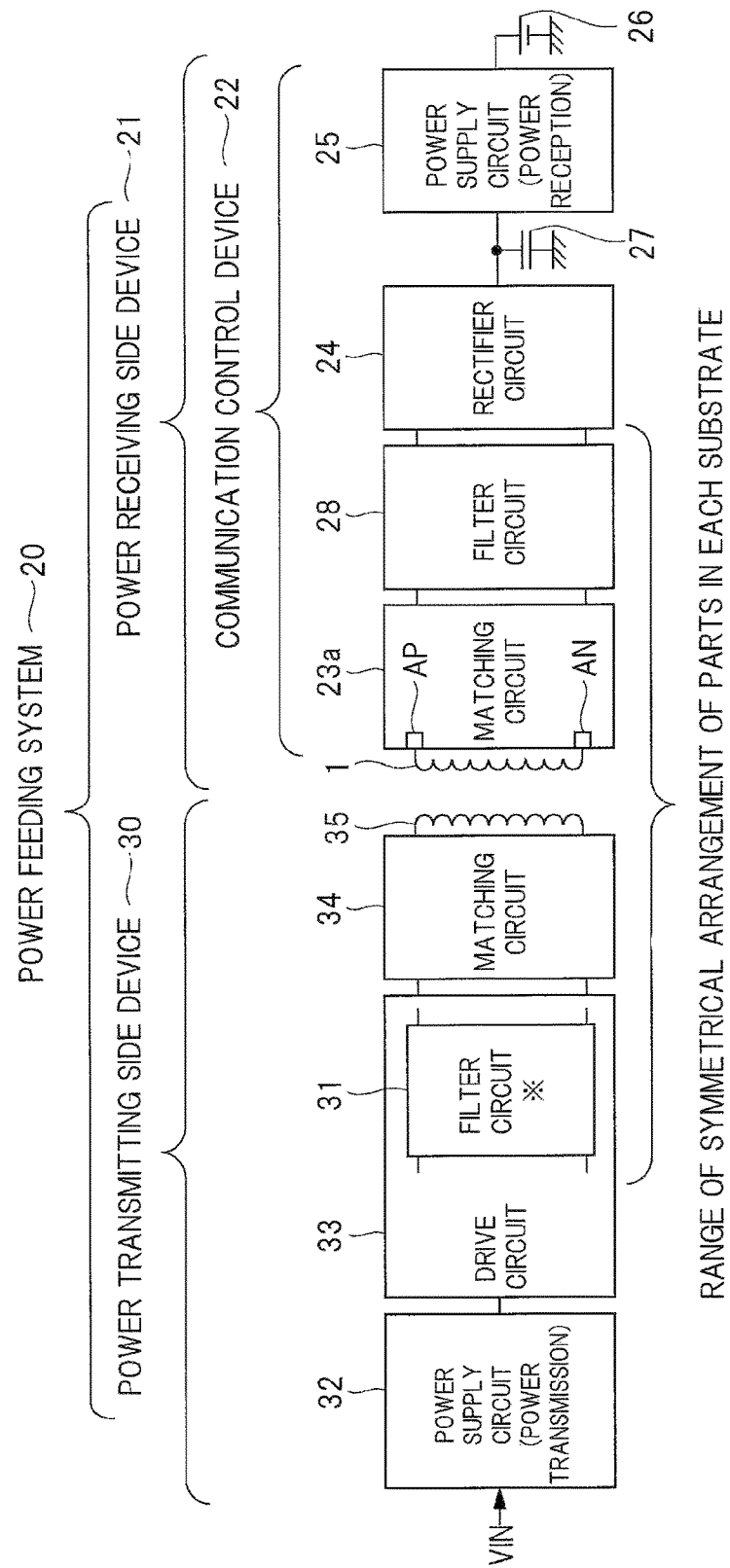
FIG. 27 is a configuration block diagram illustrating one example of a structure of a power feeding system according to a second embodiment.
Figure 28:
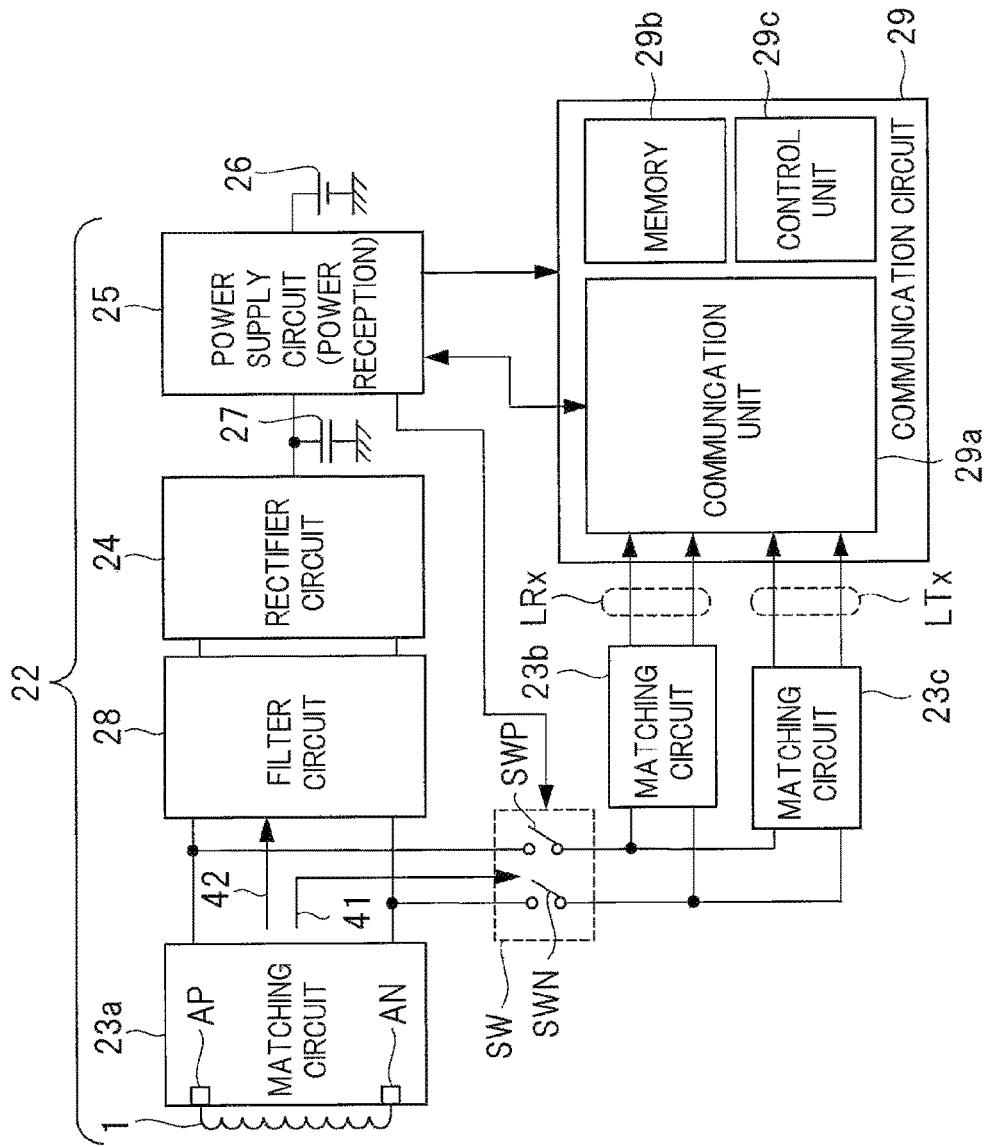
FIG. 28 is a configuration block diagram illustrating one example of a structure of a communication control device (power receiving side) in the power feeding system shown in FIG. 27.

FIG. 27 is a configuration block diagram illustrating one example of a structure of a power feeding system according to a second embodiment, and FIG. 28 is a configuration block diagram illustrating one example of a structure of a communication control device (power receiving side) in the power feeding system shown in FIG. 27.

A power feeding system shown in FIG. 27 will be described. A power feeding system 20 includes a wireless communication device on a power transmitting side (hereinafter, referred to as "power transmitting side device") 30 and a wireless communication device on a power receiving side (hereinafter, referred to as "power receiving side device") 21. In the power feeding system 20, data can be transmitted and received between the power transmitting side device 30 and the power receiving side device 21 by means of short range radio (wireless) communication. The short range radio communication is a short range radio communication executed by, for example, NFC (Near Field Communication) (hereinafter, simply referred to as "NFC communication").

Further, in the power feeding system 20, power feeding from the power transmitting side device 30 to the power receiving side device 21 in a non-contact (wireless, radio) manner is possible. Although not particularly limited, the wireless power feeding system 20 is formed as an electromagnetic resonance type power feeding system, and an antenna for communication by NFC is used also as an antenna for electromagnetic resonance type wireless power feeding, so that it is possible to selectively switch the power transmission/reception and the communication for information transmission to be executed.

The power transmitting side device 30 is provided with, for example, a power supply circuit 32, a drive circuit 33, a filter circuit 31, a matching circuit 34, and an antenna 35.

The matching circuit 34 is a circuit for executing impedance matching between the antenna 35 and an internal circuit connected to the antenna 35, and for example, it is connected to the antenna in parallel to form a resonance circuit. Although not particularly limited, the antenna 35 is a loop antenna. FIG. 27 illustrates the case where the antenna 35 is a common antenna for executing the power feeding and the signal transmission/reception by the NFC communication, but the configuration around the antenna is not particularly limited. For example, a configuration in which an antenna for executing the power feeding and an antenna for executing the NFC communication are separately provided and the antennas are selectively switched and driven in accordance with a kind of communication may be adopted.

The drive circuit 33 generates a driving signal for driving the antenna 35. For example, when the signal transmission by the NFC communication is executed, the drive circuit 33 generates the driving signal in accordance with data to be transmitted, and when the power feeding is executed, the drive circuit 33 generates the driving signal in accordance with magnitude of electric power to be fed. The antenna 35 is excited by the driving signal. Further, the drive circuit 33 is operated by using, for example, output voltage output from the power supply circuit 32 as a power source.

The power supply circuit 32 generates a plurality of voltages to be an operation power source of each functional unit in the power transmitting side device 30 based on, for example, input voltage VIN supplied from a power supply adapter, a universal serial bus (USB) or the like. For example, the power supply circuit 32 generates voltage to be an operation power source of the drive circuit 33.

The filter circuit 31 is a circuit for reducing a noise and is arranged right before the final stage in an amplifier in the drive circuit 33.

On the other hand, the power receiving side device 21 is, for example, a small portable device such as a potable terminal, and the NFC communication and a battery charge by wireless power feeding (non-contact power feeding) are possible. The power receiving side device 21 includes, for example, a loop antenna 1, a communication control device 22, a battery 26, and an internal circuit. The loop antenna 1 generates electromotive force (AC signal) by a resonance effect of electromagnetic wave generated by the antenna 35 of the power transmitting side device 30, and the loop antenna 1 executes the signal transmission/reception according to the NFC communication. Further, the internal circuit is an electronic circuit to achieve a specific function as the power receiving side device 21 (for example, a smartphone or the like).

The battery 26 is a secondary battery which is rechargeable based on DC voltage. Although not particularly limited, the battery 26 is, for example, a battery with one cell (4.0 to 4.2 V) and is, for example, a lithium ion battery.

The communication control device 22 selectively switches a power feeding operation to perform power reception using one loop antenna 1 and a communication operation to perform communication for information transmission, and executes the selected operation. Specifically, the communication control device 22 transmits and receives data via the loop antenna 1 in the data communication operation, and the communication control device 22 generates a desirable voltage based on electric power received via the loop antenna 1 and drives each block in the communication control device 22 and the internal circuit or charges the battery 26 by using the generated voltage in the power feeding operation.

More specifically, as shown in FIG. 28, the communication control device 22 is configured as a communication module in which antenna electrodes AP and AN, matching circuits 23a, 23b and 23c, a filter circuit 28, a power supply circuit 25, a switch unit SW and a communication circuit 29 are mounted on a mounting substrate or the like.

The antenna electrodes AP and AN are electrodes to connect the loop antenna 1. One end of the loop antenna 1 is connected to the antenna electrode AP and the other end is connected to the antenna electrode AN. The antenna electrodes AP and AN are electrically connected to the communication circuit 29 and the power supply circuit 25.

Hereinafter, a signal path which connects the antenna electrodes AP and AN and the communication circuit 29 (path through which a signal is transmitted between the antenna electrodes AP and AN and the communication circuit 29) is referred to as "communication path", and a signal path which connects the antenna electrodes AP and AN and the power supply circuit 25 (path through which a signal is transmitted between the antenna electrodes AP and AN and the power supply circuit 25) is referred to as "power feeding path".

The communication path 41 includes not only various signal lines (wiring pattern) connected between the antenna electrodes AP and AN and the communication circuit 29 but also the matching circuits 23a, 23b and 23c, the switch unit SW and the like connected to the signal lines. Further, the communication path 41 includes a signal receiving path LRx which supplies the signal received by the loop antenna 1 to the communication circuit 29 via the antenna electrodes AP and AN and a signal transmitting path LTx which supplies the signal transmitted from the communication circuit 29 to the loop antenna 1 via the antenna electrodes AP and AN.

The signal receiving path LRx includes the matching circuit 23a, the switch unit SW, the matching circuit 23b, and various signal lines (wiring pattern) to connect them. The signal transmitting path LTx includes the matching circuit 23a, the switch unit SW, the matching circuit 23c, and various signal lines (wiring pattern) to connect them. The power feeding path 42 includes not only various signal lines (wiring pattern) connected between the antenna electrodes AP and AN and the power supply circuit 25 but also the matching circuit 23a and the like connected to the signal lines.

The communication circuit 29 executes the NFC communication with the power transmitting side device 30 via the loop antenna 1. Specifically, the communication circuit 29 includes a communication unit 29a, a memory 29b, and a control unit 29c. The communication unit 29a executes the signal transmission/reception by the NFC communication. For example, the communication unit 29a inputs the signal received by the loop antenna 1 from a positive side external terminal and a negative side external terminal, converts the input analog signal into a digital signal, and sends the digital signal to the control unit 29c in the data reception by the NFC communication.

Further, in the data transmission by the NFC communication, the communication unit 29a converts data (digital signal) received from the control unit 29c into an analog signal and outputs the analog signal from the positive side external terminal and the negative side external terminal. The control unit 29c is formed of, for example, a central processing unit (CPU), and the control unit 29c generates data to be transmitted by the NFC communication and performs various data processing based on the received data by executing a program.

The memory 29b includes ROM, RAM or the like. In the ROM, the program executed by the central processing unit is stored. The RAM is used as a working area for calculation processing executed by the central processing unit. Although not particularly limited, the communication circuit 29 is a semiconductor device of a BGA (Ball Grid Array) package in which a semiconductor chip formed on one semiconductor substrate such as single crystal silicon by a manufacturing technique of a well-known CMOS integrated circuit is sealed by insulating resin such as mold resin.

The matching circuit 23a is a circuit for matching the impedance between the loop antenna 1 and the power supply circuit 25. The matching circuits 23a, 23b and 23c are circuits for matching the impedance between the loop antenna 1 and the communication circuit 29. The matching circuits 23a, 23b and 23c include, for example, a capacitive element, an inductor and the like. For example, the matching circuit 23a includes a capacitive element connected in series between the antenna electrodes AP and AN and the power supply circuit 25.

The matching circuit 23b includes a capacitive element connected in series between the antenna electrodes AP and AN and the external terminal of the communication circuit 29, and the matching circuit 23c includes a capacitive element connected in series between the antenna electrodes AP and AN and the external terminal of the communication circuit 29 and a capacitive element connected between the antenna electrodes AP and AN and a transmission terminal. Note that the matching circuits 23a, 23b and 23c are not limited to a circuit configuration illustrated in FIG. 28, and various modifications may be adopted to obtain desirable characteristics.

The filter circuit 28 is a circuit for reducing a noise in the power feeding path 42.

The power supply circuit 25 generates various DC voltages based on the AC signal received from the loop antenna 1, and executes control to supply the generated DC voltage to each functional unit in the power receiving side device 21.

A rectifier circuit 24 rectifies the AC signal received from the loop antenna 1 and outputs the rectified signal. Although not particularly limited, the rectifier circuit 24 is abridge type full wave rectifier circuit configured by using four rectifier diodes. Further, a capacitor (condenser) 27 is a smoothing capacitor connected between the rectifier circuit 24 and the power supply circuit 25. Accordingly, the voltage rectified by the rectifier circuit 24 is smoothed.

The switch unit SW includes a switch circuit SWP provided between the antenna electrode AP and the communication circuit 29 and a switch circuit SWN provided between the antenna electrode AN and the communication circuit 29. Then, when the communication is performed through the loop antenna 1, the switch circuits SWP and SWN connect the antenna electrodes AP and AN and the communication circuit 29. On the other hand, when the power supply circuit 25 generates DC voltage based on the AC signal received by the loop antenna 1, the switch circuits SWP and SWN interrupt the connection between the antenna electrodes AP and AN and the communication circuit 29.

<Arrangement of Parts in Communication Control Device>

Figure 29:
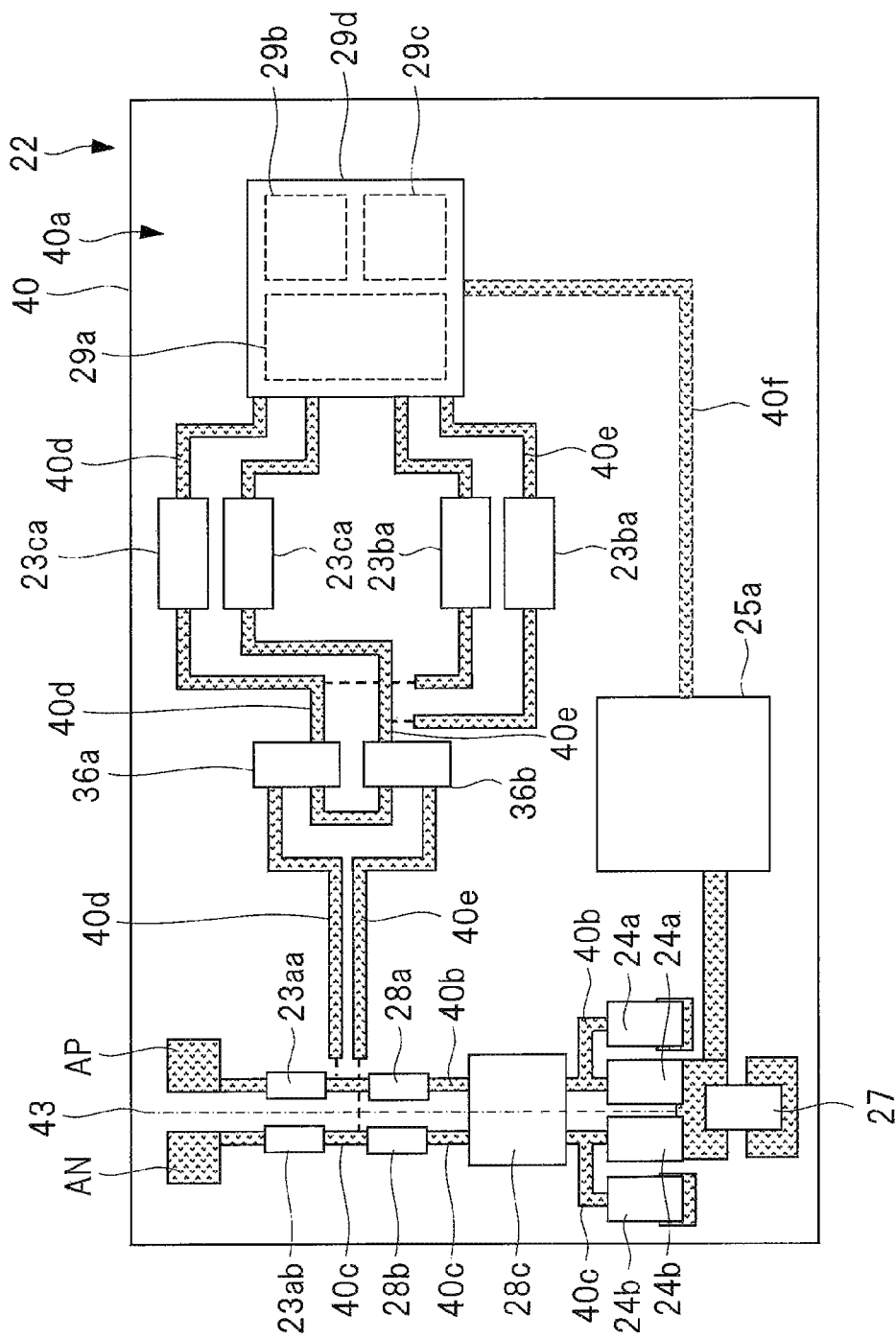
FIG. 29 is a plan view illustrating one example of an arrangement state of main parts on a mounting substrate in the communication control device shown in FIG. 28.

FIG. 29 is a plan view illustrating one example of an arrangement state of main parts on a mounting substrate in the communication control device shown in FIG. 28.

Here, mounting parts of the power feeding path (see FIG. 28) 42 mounted on a mounting substrate 40 shown in FIG. 29 will be described with reference to FIG. 28. Note that, in the communication control device 22 shown in FIG. 29, wiring patterns and main parts connected to the antenna electrodes AP and AN are formed and arranged to be symmetrical with respect to a center line 43 of the arrangement of parts in the power feeding path (see FIG. 28) 42 of wirings formed on a main surface 40a of the mounting substrate (wiring substrate) 40.

At first, in the mounting substrate 40, the antenna electrode (first connection terminal) AP to be connected to one of the electrode terminals of the loop antenna 1 and the antenna electrode (second connection terminal) AN to be connected to the other one of the electrode terminals of the loop antenna 1 are arranged at symmetrical positions with respect to the center line 43 so as to make a pair (for example, the same distance or the same shape).

At this time, the antenna electrode AP and the antenna electrode AN are provided at an end part of the main surface 40a of the mounting substrate 40. Accordingly, a space for the arrangement of parts can be secured, and the symmetrical arrangement of the parts can be facilitated.

Further, a first wiring 40b connected to the antenna electrode AP and a second wiring 40c connected to the antenna electrode AN are arranged so as to make a pair (for example, the same distance or the same shape) with respect to the center line 43 or arranged to be symmetrical with respect to the center line 43.

Also, a first resonance capacitor (resonance part) 23aa as the matching circuit 23a is provided to be connected to the antenna electrode AP via the first wiring 40b, while a second resonance capacitor (resonance part) 23ab as the matching circuit 23a is provided to be connected to the antenna electrode AN via the second wiring 40c. Further, the first resonance capacitor 23aa and the second resonance capacitor 23ab are arranged so as to make a pair (for example, the same distance or the same shape) with respect to the center line 43 or arranged to be symmetrical with respect to the center line 43.

Further, as the filter circuit 28, a first ferrite bead (noise filter circuit) 28a serving as a resistor is connected to the first wiring 40b. Similarly, as the filter circuit 28, a second ferrite bead (noise filter circuit) 28b as a resistor is connected to the second wiring 40c. Also, the first ferrite bead 28a and the second ferrite bead 28b are arranged so as to make a pair (for example, the same distance) with respect to the center line 43 or arranged to be symmetrical with respect to the center line 43.

The first ferrite bead 28a and the second ferrite bead 28b are arranged between the antenna electrodes AP and AN and the rectifier circuit 24.

Similarly, as the filter circuit 28, a common mode choke (noise filter circuit) 28c as an inductor (coil) is connected to the antenna electrodes AP and AN via the first wiring 40b and the second wiring 40c. The common mode choke 28c is arranged between the antenna electrodes AP and AN and the rectifier circuit 24.

By arranging the common mode choke 28c, current having a frequency lower than a target frequency can be allowed to flow and current having a frequency higher than the target frequency can be interrupted.

Accordingly, the first resonance capacitor 23aa is arranged between the antenna electrode AP and the noise filter circuit, while the second resonance capacitor 23ab is also arranged between the antenna electrode AN and the noise filter circuit.

Further, a first rectifier diode 24a as the rectifier circuit 24 is connected to the antenna electrode AP via the first wiring 40b, while a second rectifier diode 24b as the rectifier circuit 24 is connected to the antenna electrode AN via the second wiring 40c. Also, the first rectifier diode 24a and the second rectifier diode 24b are arranged so as to make a pair (for example, the same distance) with respect to the center line 43 or arranged to be symmetrical with respect to the center line 43. Here, two first rectifier diodes 24a and two second rectifier diodes 24b are arranged so as to make a pair (for example, the same distance) with respect to the center line 43 or arranged to be symmetrical with respect to the center line 43. Namely, four rectifier diodes are mounted in total as the rectifier circuit 24, and alternate current (sine wave) is converted into direct current (DC) by these rectifier diodes.

Further, a capacitor (condenser) 27 for smoothing voltage is provided at a latter stage of the rectifier circuit 24 so as to be connected to the antenna electrodes AP and AN via the first wiring 40b and the second wiring 40c.

Further, as the power supply circuit 25, a DC/DC converter 25a which generates DC voltage based on voltage rectified by the rectifier circuit 24 is provided at a latter stage of the capacitor (condenser) 27 so as to be connected to the antenna electrodes AP and AN via the first wiring 40b and the second wiring 40c.

Further, the communication circuit 29 shown in FIG. 28 is connected to the antenna electrodes AP and AN via the first wiring 40b and the second wiring 40c.

As described above, in the mounting substrate 40 of the communication control device 22, the main parts to be mounted and the wiring patterns are formed and arranged so as to make a pair (for example, the same distance) with respect to the center line 43 of the arrangement of parts or formed and arranged to be symmetrical with respect to the center line 43.

Especially, noise countermeasure members (ferrite bead and common mode choke) as the noise filter circuit are arranged between the antenna electrodes AP and AN and the rectifier circuit 24, preferably between the matching circuit 23a and the rectifier circuit 24 so as to make a pair (for example, the same distance) with respect to the center line 43 or arranged to be symmetrical with respect to the center line 43.

As a result, impedances on both sides of the center line 43 can be made substantially equal to each other (rectified), and thus a noise generated in the power feeding path 42 shown in FIG. 28 can be suppressed. Further, an influence of the noise from the loop antenna 1 on the rectifier circuit 24 can be reduced.

In addition, since common mode current flowing through the power feeding path 42 can be reduced, protection for a human body can be improved and an influence of the noise to a further area can be reduced.

Further, since the noise countermeasure parts (ferrite bead and common mode choke) are arranged, an influence of the noise on the loop antenna 1 connected to the antenna electrodes AP and AN can be reduced.

Next, mounting parts of the communication path (see FIG. 28) 41 mounted on the mounting substrate 40 shown in FIG. 29 will be described with reference to FIG. 28.

At first, in the power feeding path 42, a third wiring 40d and a fourth wiring 40e respectively connected to the first wiring 40b and the second wiring 40c which connect the capacitor (the first resonance capacitor 23aa, the second resonance capacitor 23ab) and the ferrite bead (the first ferrite bead 28a, the second ferrite bead 28b) are provided, and a switch IC 36a as the switch circuit SWN of the switch unit SW shown in FIG. 28 is provided in the third wiring 40d. On the other hand, a switch IC 36b as the switch circuit SWP of the switch unit SW is provided in the fourth wiring 40e.

Further, a capacitor 23ca as the matching circuit 23c and a capacitor 23ba as the matching circuit 23b are connected to the switch IC 36a via the third wiring 40d. On the other hand, the capacitor 23ca as the matching circuit 23c and the capacitor 23ba as the matching circuit 23b are similarly connected to the switch IC 36b via the fourth wiring 40e.

Also, a communication IC 29d as the communication circuit 29 is connected to each of the capacitor 23ca and the capacitor 23ba via the third wiring 40d and the fourth wiring 40e. The communication IC 29d includes a communication unit 29a, a memory 29b, and a control unit 29c. Note that the communication IC 29d is connected also to the DC/DC converter 25a via other wiring 40f and the like.

<Noise Measurement>

A measurement result of a noise in a structure in which the loop antenna 1 according to the first embodiment and the communication control device 22 according to the second embodiment are combined will be described.

Figure 30:
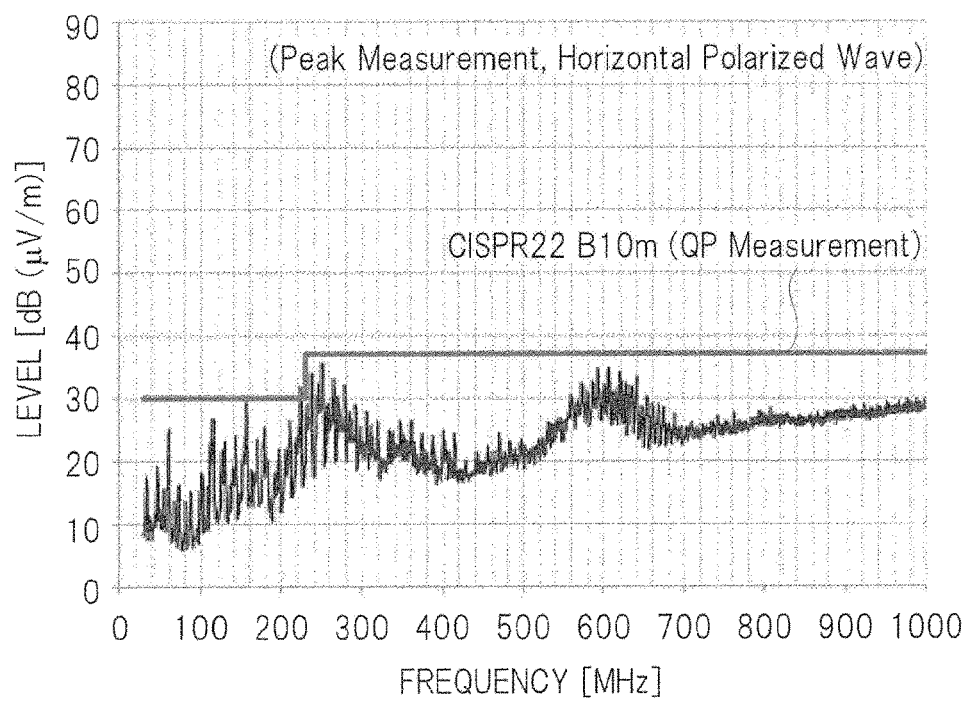
FIG. 30 is a noise measurement diagram illustrating one example of a measurement result of a noise level in the power feeding system using the communication control device shown in FIG. 28.
Figure 31:
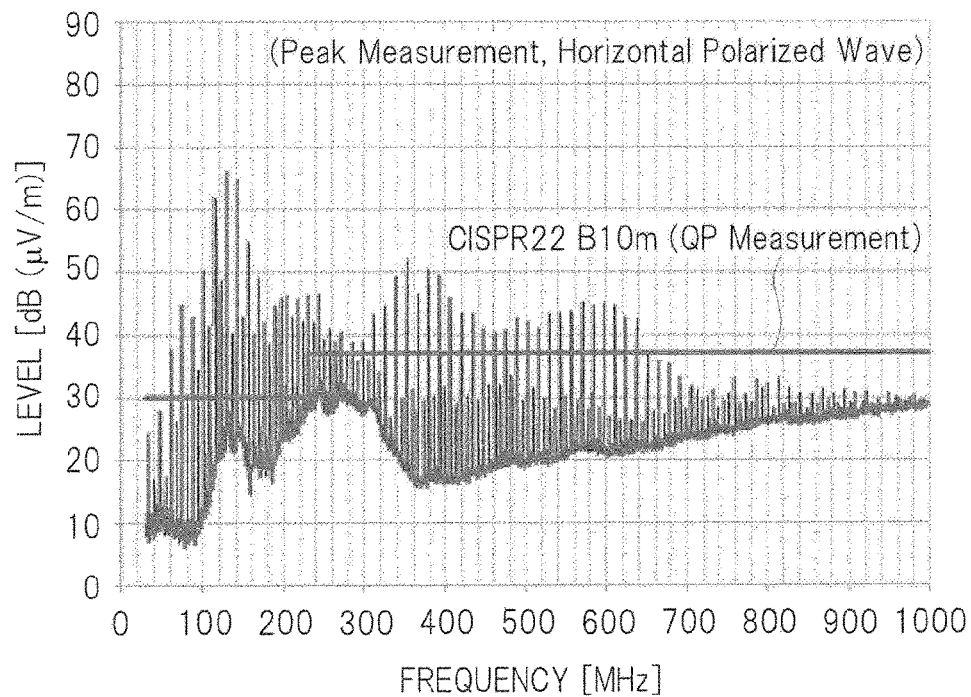
FIG. 31 is a noise measurement diagram illustrating a measurement result of a noise level in a power feeding system according to a comparative example.

FIG. 30 is a noise measurement diagram illustrating one example of a measurement result of a noise level in the power feeding system using the communication control device shown in FIG. 28, and FIG. 31 is a noise measurement diagram illustrating a measurement result of a noise level in a power feeding system according to a comparative example.

The noise measurement shown in FIG. 31 is conducted to a power feeding system as a comparative example studied by the inventors of the present invention. In the structure used for the noise measurement shown in FIG. 31, an antenna has a spiral structure, and parts on a mounting substrate in a communication control device are not arranged so as to make a pair (for example, the same distance) with respect to a center line or are not arranged to be symmetrical with respect to the center line.

The noise measurement result according to the comparative example shown in FIG. 31 indicates that the noise level is largely beyond a value defined by the CISPR22 Standard especially at a frequency of around 150 MHz.

Meanwhile, FIG. 30 illustrates the noise measurement conducted to a structure in which the symmetrical loop antenna 1 is adopted as the antenna shape according to the first embodiment and is combined with the communication control device 22 in which the parts are arranged so as to make a pair (for example, the same distance) or are arranged to be symmetrical according to the second embodiment.

FIG. 30 indicates that the noise level is below the value defined by the CISPR22 Standard in the whole frequency range to be measured.

This is probably because the electric field distribution can be made uniform by adopting the symmetrical loop antenna 1 and the noise can be reduced at frequencies of around 250, 650 and 800 MHz by mounting the common mode choke 28c in the communication control device 22.

Further, since the resonance capacitors are arranged so as to make a pair (for example, the same distance) with respect to the center line 43 or arranged to be symmetrical with respect to the center line 43 in the communication control device 22 in addition to adopting the symmetrical loop antenna 1, impedance matching can be achieved in the mounted parts, and thus the noise level at the frequency of around 150 MHz can be reduced.

As described above, the noise level can be reduced below the value defined by the CISPR22 Standard in the whole frequency range to be measured.

Further, by arranging the substrate patterns, the noise countermeasure parts, the resonance parts, the rectifier circuit parts and others to be symmetrical like the communication control device 22 according to the second embodiment and adopting the loop antenna 1 having the symmetrical antenna structure according to the first embodiment, the common mode current flowing through the power feeding path 42 in the power feeding system (communication control device 22) can be reduced. As a result, protection for a human body can be improved and an influence of a noise to a further area can be reduced.

Modified Example of Second Embodiment

Figure 32:
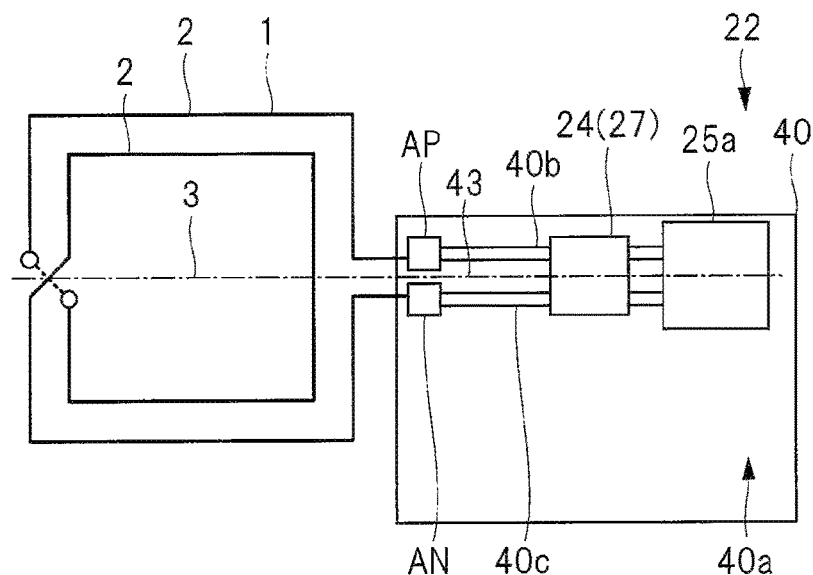
FIG. 32 is a plan view illustrating an arrangement state of main parts on a mounting substrate according to a modified example of the second embodiment.
Figure 33:
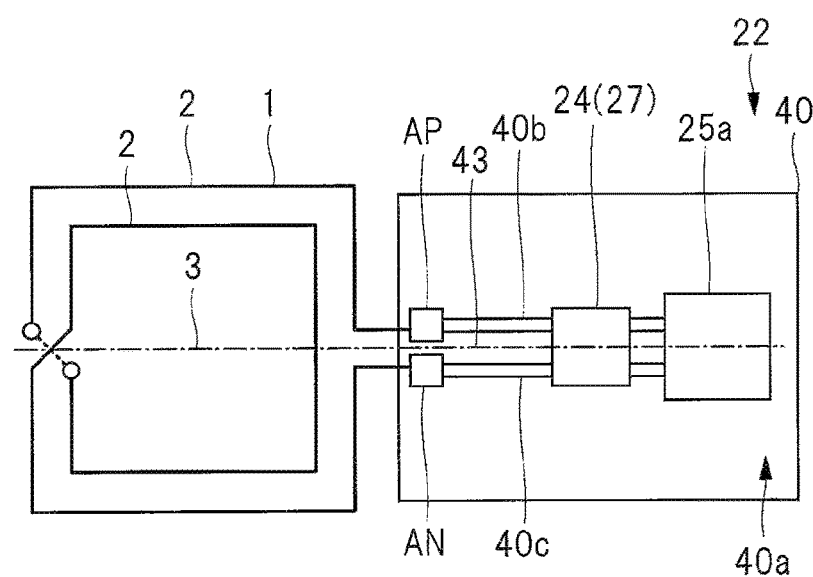
FIG. 33 is a plan view illustrating an arrangement state of main parts on a mounting substrate according to a modified example of the second embodiment.

FIG. 32 is a plan view illustrating an arrangement state of main parts on a mounting substrate according to a modified example of the second embodiment, and FIG. 33 is a plan view illustrating an arrangement state of main parts on a mounting substrate according to a modified example of the second embodiment.

In the modified example shown in FIG. 32, in the arrangement of parts on the mounting substrate 40 in the communication control device 22, the antenna electrodes AP and AN are arranged near an end part (corner part) of the main surface 40a of the mounting substrate 40, and the rectifier circuit 24 and the DC/DC converter 25a are arranged along an outer periphery in a longitudinal direction of the mounting substrate 40.

In this manner, since a substrate area of the mounting substrate 40 can be effectively used, the substrate area or the substrate size can be reduced.

Further, in the modified example shown in FIG. 33, in the arrangement of parts on the mounting substrate 40 in the communication control device 22, the antenna electrodes AP and AN are arranged near a center part of one side of the main surface 40a of the mounting substrate 40, and the rectifier circuit 24 and the DC/DC converter 25a are arranged at the center in a longitudinal direction of the mounting substrate 40.

In this case, it is easy to secure a space for symmetrically arranging the rectifier circuit 24 and the DC/DC converter 25a, and as a result, wiring design on the substrate can be facilitated.

Modified Example

In the foregoing, the invention made by the inventors of the present invention has been concretely described based on the embodiments. However, it is needless to say that the present invention is not limited to the foregoing embodiments and various modifications and alterations can be made within the scope of the present invention.

First Modified Example

In the second embodiment described above, regarding an arrangement position of the filter circuit (noise filter circuit) 28 between the antenna electrodes AP and AN and the rectifier circuit 24, that is, arrangement positions of the ferrite bead (the first ferrite bead 28a and the second ferrite bead 28b) and the common mode choke 28c, either of them may be arranged on a former stage (side adjacent to the antenna electrodes AP and AN) or arranged on a latter stage.

Second Modified Example

Also, several modified examples may be mutually combined within a scope of the gist of the technical idea described in the embodiments above.

Third Modified Example

Further, in any of the antenna structures shown in FIGS. 1, 2, 7, 9 and 11 to 26 in the embodiment described above, the loop shape is formed to be symmetrical with respect to the center line 3 in a plan view, so that the distribution of the electric field and the magnetic field generated around the antenna can be made uniform and the noise radiated from the loop antenna can be reduced.

In addition, any of the sectional structures of the antennas described above is formed to be symmetrical with respect to the center line 3, and thus the noise can be further reduced.

REFERENCE SIGNS LIST 1 loop antenna
2 loop-shaped member (conductive wiring, antenna body)
2a first loop-shaped member
2b second loop-shaped member
2c first electrode terminal
2d second electrode terminal
2e intersection part
2f penetrating electrode (via wiring)
2h, 2ha switching part (conductive part)
3 center line
4 substrate
4a front surface (first surface)
4b back surface (second surface)
5 electric field
21 power receiving side device
22 communication control device
23a, 23b, 23c matching circuit
23aa first resonance capacitor (matching circuit)
23ab second resonance capacitor (matching circuit)
24 rectifier circuit
24a first rectifier diode (rectifier circuit)
24b second rectifier diode (rectifier circuit)
25 power supply circuit
25a DC/DC converter (power supply circuit)
27 capacitor (condenser)
28 filter circuit (noise filter circuit)
28a first ferrite bead (filter circuit, resistor)
28b second ferrite bead (filter circuit, resistor)
28c common mode choke (filter circuit, inductor, coil)
29 communication circuit
40 mounting substrate (wiring substrate)

The invention claimed is:

1. A loop antenna, comprising:
a first electrode terminal;
a second electrode terminal arranged to make a pair with the first electrode terminal;
a loop-shaped member which has one end connected to the first electrode terminal and an other end connected to the second electrode terminal and comprises a conductive material,
wherein the first electrode terminal and the second electrode terminal are arranged so as to make a pair with respect to a center line of a loop shape of the loop-shaped member, and
wherein the loop-shaped member is wound a plurality of times, and includes an intersection part at which mutually adjacent loop-shaped members intersect with each other in a plan view; and
at least a pair of penetrating electrodes disposed on opposing sides of the intersection part and penetrating between a first wiring layer and a second wiring layer of the loop antenna to connect one of the mutually adjacent loop-shaped members to an other one of the mutually adjacent loop-shaped members,
wherein the intersection part is arranged so as to overlap with the center line in a plan view, and
wherein the loop-shaped member is continuously connected and formed to be symmetrical with respect to the center line.

2. The loop antenna according to claim 1, wherein the intersection part includes a plurality of the intersection parts including a first intersection part and a plurality of second intersection parts,
wherein the first intersection part is arranged so as to overlap with the center line in the plan view, and
wherein the second intersection parts are arranged so as to make a pair with respect to the center line.

3. The loop antenna according to claim 2, wherein, in a case in which a number of windings is an even number, a number of the intersection parts is an odd number.

4. The loop antenna according to claim 2, wherein, in a case in which a number of windings is an odd number, a number of the intersection parts is an even number.

5. The loop antenna according to claim 2, wherein the first intersection part includes a plurality of the first intersection parts, and the first intersection parts are arranged so as to overlap with the center line and separately arranged on a terminal side where the first and second electrode terminals are located and on a side opposite to the terminal side.

6. The loop antenna according to claim 1, wherein the loop-shaped member includes a first loop-shaped member and a second loop-shaped member adjacent to each other, and the loop-shaped member includes a switching part at which switching from the first loop-shaped member to the second loop-shaped member or switching from the second loop-shaped member to the first loop-shaped member is made.

7. The loop antenna according to claim 6, wherein the switching part includes two switching parts, and
wherein the intersection part is a part at which the two switching parts intersect with each other in the plan view.

8. The loop antenna according to claim 1, wherein the loop-shaped members in the loop-shaped member wound a plurality of times are arranged to overlap with each other in the plan view.

9. A communication control device, comprising:
a wiring substrate on which a wiring is formed;
a first connection terminal formed on a main surface of the wiring substrate and connected to one electrode terminal of a loop antenna;
a second connection terminal formed on the main surface of the wiring substrate and connected to an other electrode terminal of the loop antenna;
a power supply circuit connected to the first and second connection terminals;
a communication circuit connected to the first and second connection terminals;
a first wiring connected to the first connection terminal;
a second wiring connected to the second connection terminal;
a first rectifier circuit connected to the first wiring;
a second rectifier circuit connected to the second wiring; and
a noise filter circuit connected to the first and second wirings and arranged between the first and second connection terminals and the first and second rectifier circuits,
wherein each of the first and second connection terminals, the first and second wirings, the noise filter circuit, and the first and second rectifier circuits are arranged so as to make respective pairs with respect to a center line of an arrangement of parts.

10. The communication control device according to claim 9, wherein the noise filter circuit comprises resistors arranged so as to make a pair with respect to the center line.

11. The communication control device according to claim 9, wherein the noise filter circuit comprises an inductor.

12. The communication control device according to claim 9, further comprising:
a first resonance capacitor arranged between the first connection terminal and the noise filter circuit and connected to the first wiring; and
a second resonance capacitor arranged between the second connection terminal and the noise filter circuit and connected to the second wiring,
wherein the first and second resonance capacitors are arranged so as to make a pair with respect to the center line.

13. The communication control device according to claim 9, further comprising:
a DC/DC converter connected to the first and second wirings and configured to generate a DC voltage based on voltage rectified by the first and second rectifier circuits.

14. The communication control device according to claim 9, wherein the first and second connection terminals are arranged at an end part of the main surface of the wiring substrate.

15. A communication control device, comprising:
a substrate comprising a first surface, a second surface opposite to the first surface, and a first electrode terminal and a second electrode terminal provided on the first surface;
a continuous conductive wiring including a first wiring layer in which a first wiring is formed, a second wiring layer in which a second wiring is formed, and a plurality of penetrating electrodes penetrating between the first wiring layer and the second wiring layer and connecting the first wiring and the second wiring; and
a wiring substrate in which a first connection terminal connected to one electrode terminal of the conductive wiring, a second connection terminal connected to an other electrode terminal of the conductive wiring, a power supply circuit connected to the first and second connection terminals, and a communication circuit connected to the first and second connection terminal are formed on a main surface,
wherein a plurality of wiring layers laminated between the first surface and the second surface of the substrate are formed of the first wiring, the second wiring and the plurality of the penetrating electrodes, one end is connected to the first electrode terminal, and the other end is connected to the second electrode terminal,
wherein the conductive wiring is wound by at least two turns along an outer periphery of the substrate from the first electrode terminal,
wherein the plurality of the penetrating electrodes include a plurality of penetrating electrode pairs having a pair of the penetrating electrodes formed of two penetrating electrodes,
wherein at least one of the plurality of penetrating electrode pairs connects the first wiring and the second wiring,
wherein the conductive wiring continuously extends from the first wiring layer to the second wiring layer and from the second wiring layer to the first wiring layer via at least one of the plurality of penetrating electrode pairs,
wherein the first and second electrode terminals are arranged so as to make a pair along an outer periphery of the first surface in a plan view, and
wherein the plurality of the penetrating electrode pairs are arranged so as to face the first electrode terminal and the second electrode terminal making a pair in a plan view, or each of at least two penetrating electrode pairs of the plurality of penetrating electrode pairs is arranged at a same distance from each of the first electrode terminal and the second electrode terminal making a pair, or the plurality of the penetrating electrode pairs are arranged so as to face the first electrode terminal and the second electrode terminal making a pair and each of at least two penetrating electrode pairs of the plurality of penetrating electrode pairs is arranged at a same distance from each of the first electrode terminal and the second electrode terminal making a pair.

16. The communication control device according to claim 15, wherein the conductive wiring includes an intersection part at which conductive parts, each of which connect a pair of the penetrating electrodes in each of any two penetrating electrode pairs among the plurality of the penetrating electrode pairs, intersect with each other in the plan view.

17. The communication control device according to claim 16, wherein, in a case in which a number of turns of the conductive wiring along the outer periphery of the substrate is an even number, a number of the intersection parts is an odd number.

18. The communication control device according to claim 16, wherein, in a case in which a number of turns of the conductive wiring along the outer periphery of the substrate is an odd number, a number of the intersection parts is an even number.

19. The communication control device according to claim 9, wherein the first rectifier circuit and the second rectifier circuit are located between the noise filter circuit and the power supply circuit.

20. The communication control device according to claim 19, further comprising a voltage condenser located between the first rectifier circuit and the power supply circuit.

* * * * *